United States Patent
Wada et al.

(10) Patent No.: US 11,216,424 B2
(45) Date of Patent: Jan. 4, 2022

(54) DYNAMICALLY RENDERING AN APPLICATION PROGRAMMING INTERFACE FOR INTERNET OF THINGS APPLICATIONS

(71) Applicant: SPATIKA TECHNOLOGIES INC., Dublin, CA (US)

(72) Inventors: Kenneth Wada, San Jose, CA (US); Murthy Ivaturi, Dublin, CA (US)

(73) Assignee: SPATIKA TECHNOLOGIES INC., Dublin, CA (US)

( * ) Notice: Subject to any disclaimer, the term of this patent is extended or adjusted under 35 U.S.C. 154(b) by 0 days.

(21) Appl. No.: 16/882,173

(22) Filed: May 22, 2020

(65) Prior Publication Data

US 2020/0311040 A1 Oct. 1, 2020

Related U.S. Application Data

(63) Continuation-in-part of application No. 16/002,765, filed on Jun. 7, 2018, now Pat. No. 10,666,718.

(51) Int. Cl.

| | |
|---|---|
| *G06F 15/16* | (2006.01) |
| *G06F 16/21* | (2019.01) |
| *G06F 16/2457* | (2019.01) |
| *H04L 29/08* | (2006.01) |
| *G06F 16/958* | (2019.01) |
| *G06F 16/955* | (2019.01) |

(52) U.S. Cl.
CPC ...... *G06F 16/211* (2019.01); *G06F 16/24573* (2019.01); *G06F 16/9566* (2019.01); *G06F 16/986* (2019.01); *H04L 67/02* (2013.01)

(58) Field of Classification Search
CPC ............ G06F 16/211; G06F 16/24573; G06F 16/986; G06F 16/9566; H04L 67/02
See application file for complete search history.

(56) References Cited

U.S. PATENT DOCUMENTS

| | | |
|---|---|---|
| 6,477,580 B1 | 11/2002 | Bowman-Amuah |
| 6,513,041 B2 | 1/2003 | Tarin |
| 6,985,754 B1 | 1/2006 | Pedersen et al. |
| 7,626,934 B2 | 12/2009 | Oouchi et al. |

(Continued)

OTHER PUBLICATIONS

International Search Report and Written Opinion of the International Searching Authority dated Aug. 26, 2021 for International Application No. PCT/US2021/033178, filed May 19, 2021, 8 pgs.

*Primary Examiner* — Razu A Miah
(74) *Attorney, Agent, or Firm* — Brooks Kushman P.C.

(57) ABSTRACT

A schema server receives from an application server vendor ID, solutions ID, and version fields extracted from a universally unique identifier (UUID) of a node and defining a protocol agnostic metadata schema application descriptor sheet identifier (PAMS ADS ID). The schema server retrieves from the memory a protocol agnostic metadata schema application descriptor sheet (PAMS ADS) that contains a list of property-type pairs and corresponds to the PAMS ADS ID, and sends the PAMS ADS to a host services gateway such that the host services gateway, using the PAMS ADS, establishes communications with the node and exposes an interface of the node as a web application programmer's interface (API).

15 Claims, 20 Drawing Sheets

(56) References Cited

U.S. PATENT DOCUMENTS

| | | | |
|---|---|---|---|
| 7,937,484 B2* | 5/2011 | Julia | H04W 4/80 709/231 |
| 8,195,744 B2* | 6/2012 | Julia | H04N 21/47202 709/205 |
| 8,239,455 B2 | 8/2012 | Wang | |
| 8,266,308 B2 | 9/2012 | Rydberg et al. | |
| 8,472,439 B2 | 6/2013 | Cohen et al. | |
| 9,418,052 B2* | 8/2016 | Shelby | G06F 40/143 |
| 2002/0120679 A1 | 8/2002 | Hayton et al. | |
| 2003/0051236 A1* | 3/2003 | Pace | H04L 67/34 717/177 |
| 2003/0084134 A1* | 5/2003 | Pace | H04L 69/40 709/223 |
| 2003/0088573 A1 | 5/2003 | Stickler | |
| 2003/0191719 A1* | 10/2003 | Ginter | G06F 21/10 705/54 |
| 2004/0019586 A1 | 1/2004 | Harter | |
| 2006/0085516 A1 | 4/2006 | Farr et al. | |
| 2006/0123128 A1 | 6/2006 | Feingold et al. | |
| 2006/0136233 A1* | 6/2006 | Takeda | H04L 12/4641 709/227 |
| 2006/0294048 A1 | 12/2006 | Shukla et al. | |
| 2007/0143302 A1 | 6/2007 | Stone | |
| 2007/0143315 A1 | 6/2007 | Stone | |
| 2007/0189279 A1* | 8/2007 | Thalanany | H04L 63/10 370/356 |
| 2008/0016332 A1 | 1/2008 | Holden et al. | |
| 2009/0113064 A1 | 4/2009 | Yamaki | |
| 2009/0187579 A1* | 7/2009 | Brancaccio | G06F 16/2471 |
| 2010/0017528 A1 | 1/2010 | Awano | |
| 2010/0036859 A1 | 2/2010 | Pinto et al. | |
| 2011/0016348 A1* | 1/2011 | Pace | H04L 67/10 714/2 |
| 2011/0066875 A1* | 3/2011 | James | H04W 4/80 709/231 |
| 2011/0137934 A1* | 6/2011 | Pizzorni | G06F 9/5088 707/769 |
| 2011/0137935 A1* | 6/2011 | Bobick | H04L 67/10 707/769 |
| 2011/0281567 A1 | 11/2011 | Moliner et al. | |
| 2012/0005205 A1* | 1/2012 | Bobick | G06F 8/65 707/736 |
| 2012/0072548 A1* | 3/2012 | Kim | H04L 67/02 709/219 |
| 2013/0091252 A1* | 4/2013 | Pizzorni | H04L 69/329 709/219 |
| 2013/0125136 A1 | 5/2013 | Kalra et al. | |
| 2013/0185347 A1* | 7/2013 | Romano | H04L 12/1818 709/203 |
| 2013/0211546 A1* | 8/2013 | Lawson | H04L 67/02 700/9 |
| 2013/0254262 A1 | 9/2013 | Udall | |
| 2014/0003441 A1 | 1/2014 | Shachar et al. | |
| 2014/0074572 A1* | 3/2014 | Bell | G06Q 30/02 705/14.7 |
| 2014/0108665 A1 | 4/2014 | Arora | |
| 2014/0122574 A1 | 5/2014 | Lee et al. | |
| 2014/0334492 A1 | 11/2014 | Mack-Crane | |
| 2015/0365480 A1* | 12/2015 | Soto | H04L 12/281 709/224 |
| 2015/0378587 A1* | 12/2015 | Falaki | G06F 3/0346 715/747 |
| 2016/0007223 A1 | 1/2016 | Sun et al. | |
| 2016/0105501 A1* | 4/2016 | Choi | H04L 63/08 709/225 |
| 2016/0127368 A1 | 5/2016 | Sun et al. | |
| 2016/0227294 A1* | 8/2016 | Liekens | H04N 21/2353 |
| 2017/0140363 A1* | 5/2017 | Hicks | G06K 7/10762 |
| 2017/0215023 A1* | 7/2017 | Ly | H04W 60/005 |
| 2019/0379725 A1* | 12/2019 | Wada | G06F 9/547 |

\* cited by examiner

DYNAMICALLY RENDERING AN APPLICATION PROGRAMMING INTERFACE FOR INTERNET OF THINGS APPLICATIONS

CROSS-REFERENCE TO RELATED APPLICATION

This application is a continuation-in-part of application Ser. No. 16/002,765, filed Jun. 7, 2018, the entire contents of which are incorporated by reference herein.

TECHNICAL FIELD

This application relates to techniques that enable Internet of Things devices to dynamically register and render an application programmer's interface in a cloud services infrastructures.

BACKGROUND

A typical Internet of Things (IOT) infrastructure includes an application server and a host services gateway. The application server can be connected with one or more computing devices (e.g., a desk top computer, a mobile phone, a tablet, etc.), with communication therebetween being facilitated by the Hypertext Markup Language (HTML) programming language and JavaScript Object Notation (JSON) data format. The host services gateway can be connected with an array of devices. Meaningful information from the devices is rendered to the stakeholders via an Application Programmer's Interface (API). The API is typically a product of a Marketing Requirements Document (MRD). The API contains the metadata for all the variables and methods for the devices.

The API is typically embedded as part of the application which resides in any one of the devices. The API is exposed as a specification which describes a method for retrieving and storing the information which is embedded within the application. Application APIs are typically hard coded into services infrastructure. That is, each of the devices has a specific custom data model the requires a custom API. This arrangement works well if all applications never change and are the same. Any modified application or newly introduced application, however, requires an API/infrastructure overhaul.

Changes to a services infrastructure can be costly and require Preventive Maintenance (PM) schedules and re-commissioning services to ensure continuous operations within the modern Enterprise Resource Planning (ERP) environment or Manufacturing Execution Systems (MES) environment. Some of the disruptions are considered normal course of operations, and may be caused by Node firmware bug-fix and maintenance processes, Node modifications (usually additions of new features to the API), new Node or applications services desired by the customer, or any other changes due to commercial and governmental compliance requirements.

The desired or required changes are typically seen as a net positive from the operational point of view, and the requirement of a time consuming infrastructure upgrade is the typical course of action for affecting such changes.

SUMMARY

A data transport system has an application server, including a first hardware processor coupled to a first memory, that extracts vendor ID, solutions ID, and version fields from a universally unique identifier (UUID) of a node. The vendor ID, solutions ID, and version fields define a protocol agnostic metadata schema application descriptor sheet identifier (PAMS ADS ID). The data transport system further has a schema server, including a second hardware processor coupled to a second memory, that retrieves a protocol agnostic metadata schema application descriptor sheet (PAMS ADS) that contains a list of property-type pairs and corresponds to the PAMS ADS ID, and a host services gateway, including a third hardware processor coupled to a third memory, that, using the PAMS ADS, establishes communications with the node and exposes an interface of the node as a web application programmer's interface (API) using the PAMS ADS.

The property-type pairs may define metadata-binding to a property value. The PAMS ADS may describe a protocol agnostic metadata schema (PAMS) that defines a data interface for variables. The UUID may change as the data interface changes. The node may communicate with local devices via independent native protocols and store the PAMS. The PAMS may be generated based on one or more enumerated types defined in one or more source code files for the node. The variables may be mapped to software variables used by the node. The PAMS may be encoded in extensible markup language (XML). The PAMS may bind instances of the variables to a record that describes the data interface.

A data transport method includes extracting vendor ID, solutions ID, and version fields from a universally unique identifier (UUID) of a node. The vendor ID, solutions ID, and version fields define a protocol agnostic metadata schema application descriptor sheet identifier (PAMS ADS ID). The data transport method further includes retrieving a protocol agnostic metadata schema application descriptor sheet (PAMS ADS) that contains a list of property-type pairs and corresponds to the PAMS ADS ID, and establishing communications with the node using the PAMS ADS.

The data transport method may further include exposing an interface of the node as a web application programmer's interface (API) using the PAMS ADS. The data transport method may further include communicating with local devices via independent native protocols. The PAMS ADS may describe a protocol agnostic metadata schema (PAMS) that defines a data interface for variables, and the data transport method may further include binding instances of the variables to a record that describes the data interface using the PAMS.

A schema server includes a hardware processor, coupled to a memory, that receives from an application server vendor ID, solutions ID, and version fields extracted from a universally unique identifier (UUID) of a node and defining a protocol agnostic metadata schema application descriptor sheet identifier (PAMS ADS ID). The hardware processor further retrieves from the memory a protocol agnostic metadata schema application descriptor sheet (PAMS ADS) that contains a list of property-type pairs and corresponds to the PAMS ADS ID, and sends the PAMS ADS to a host services gateway such that the host services gateway, using the PAMS ADS, establishes communications with the node and exposes an interface of the node as a web application programmer's interface (API).

The property-type pairs may define metadata-binding to a property value. The PAMS ADS may describe a protocol agnostic metadata schema (PAMS) that defines a data interface for variables. The UUID may change as the data interface changes.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Techniques are described that may render obsolete the need for certain infrastructure upgrades. Such an improved system may enable zero configuration and downtime for commissioning of new devices, zero changes to the services infrastructure, continued and reliable operations during new device introductions, dynamic rendering of a user dashboard to view any device within the network, and modification of the user dashboard by any stakeholder.

A connectivity system is developed to incorporate a dynamic data transport technology that allows a seamless and self-configuring connection between the enterprise and business systems. The connectivity system may include a Web Services Application Programming Interface (API) (Web Services API). The connectivity system may include an Application Server and a Host Services Gateway (HSG), a Schema Server, and a Customer Relationship Manager (CRM) Sever that may cooperate to implement the Web Services API. The connectivity system may include one or more Solutions Gateway Devices. And, the Solutions Gateway Devices may include a processor system that executes one or more applications referred to as Nodes.

Figure 1:
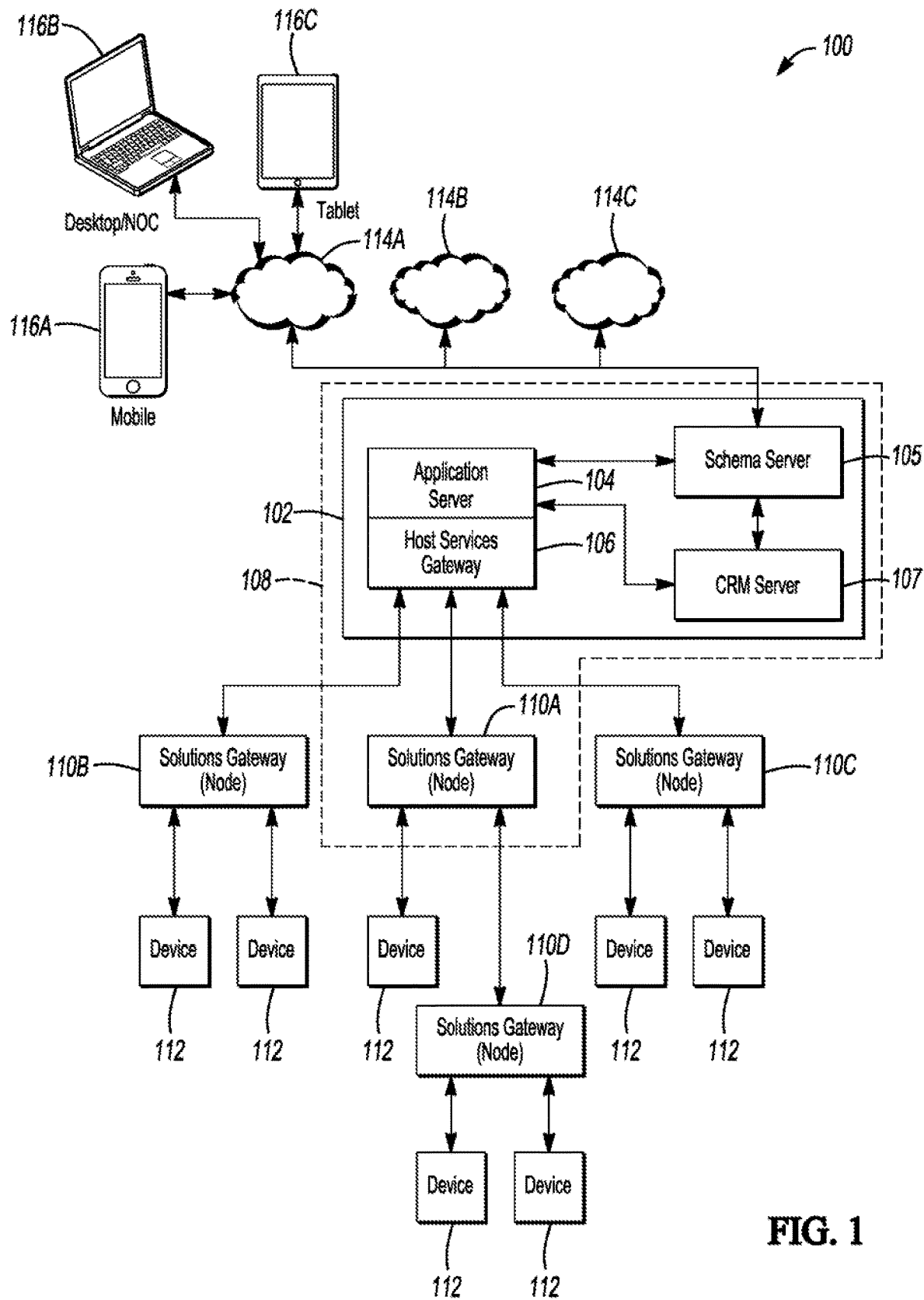
FIG. 1 depicts a diagram of a system for Enterprise Requirement Planning (ERP).

FIG. 1 shows a graphical depiction of a data transport system or connectivity system 100 and how it interacts with the system environment. FIG. 1 also includes some of the Nodes interconnected in a cascaded arrangement.

The data transport system 100 may include a Web Services API 102 that is implemented as part of an Application Server 104, a Schema Server 105, a Host Services Gateway 106, and a Customer Relationship Manager (CRM) Server 107, which may be executed as applications or programs on a computing system 108. Each of these items may have its own hardware processor and memory coupled thereto. The CRM Server 107 is a secure database that acts as a repository of authenticated UUIDs and known devices. As will be discussed in more detail below, portions of the UUID are bound to a schema database, which contains all protocol agnostic metadata schema (PAMS) Application Descriptor Sheet (ADS) schemas, held in the Schema Server 105. Moreover, the Schema Server 105 and CRM Server 107 may be stored in physically different places for security purposes.

The connectivity system 100 may include a plurality of devices or systems 112. Here, a device is any construct (hardware, software program, etc.) which contains a singular or a set of applications. Each application is associated with a schema, or PAMS ADS. Any device may contain a singular or a set of applications. Thus, any device may contain a singular or a set of schema or PAMS ADSs. The devices 112 may include devices that are operated within a or station. For example, the devices 112 may be part of a factory automation system or process control system. The devices 112 may represent the output of various sensors and production systems. The devices 112 may also be defined by input variables such as operating setpoints. The devices 112 may define manufacturing line and process data points.

The devices 112 may communicate with one or more Solutions Gateways or Nodes 110A, 110B, 110C. In some configurations, one or more of the Nodes (e.g., 110A) may be executed as a program or application on the computing system 108. In some configurations, a may have one Node that communicates with all the devices 112 within the associated plant or facility. In some configurations, Nodes may be cascaded such that one of the Nodes (e.g., 110D) communicates with devices 112 and communicates with another Node (e.g., 110A). The Nodes may be characterized as Master or Slave Nodes depending on a position within the communication chain. Communications between the Nodes 110 and the devices 112 may be characterized as a native transport protocol. In the plant environment, there may be a wide range of native transport protocols. For example, the devices 112 may communicate over an RS232 channel, an RS 485 channel, a USB channel, a parallel data channel. The devices 112 may communicate via a wireless communication channel such as Bluetooth. The devices 112 may communicate over a wired or wireless Ethernet link as defined by Institute of Electrical and Electronics Engineers (IEEE) 802 family of standards. For example, IEEE 802.11 may include all variants of the 802.11 specification such as 802.11 a/b, n, g, etc. The devices may communicate with a variety of protocols such as Transmission Control Protocol/Internet Protocol (TCPIP). The devices may communicate with various wireless standards such as WiMax, cellular, ZigBee. The devices 112 may communicate with industrial communication protocols such as Modbus, Profinet, or other industrial control protocols. The native transport protocol may be selected at the plant level to be most suitable for the process or production environment. The native transport protocol may include Peripheral Component Interconnect (PCI) interfaces. PCI interfaces may include all variants such as Peripheral Component Interconnect express (PCIe), Peripheral Component Interconnect eXtended (PCI-x), etc. The Nodes 110 may support multiple native transport protocols depending on the number and type of devices 112 that are connected.

The Nodes 110 may be configured to communicate with the Host Services Gateway 106. Communication between the Host Services Gateway 106 and the one or more Nodes 110 may be via a Media Independent Messaging Services (MIMS) adaptation layer. The MIMS adaptation layer may also be used as a data link layer (DLL). The MIMS adaption layer may be implemented as a session layer over an existing media driver layer. For example, the media driver layer of the Open System Interconnection (OSI) model is known as the Media Access Control (MAC) and Data Link Layer (DLL). The implementation may be transparent with respect to the existing MAC and DLL for existing media. The MIMS abstraction layer may efficiently abstract any media dependencies and allow the data transport in a seamless fashion on any media. The MIMS adaption layer may be a thin-server protocol that can be implemented on constrained devices. The MIMS adaption layer may be configured to provide a media independent way to transport process data between the Nodes 110 and the Host Services Gateway 106.

The Host Services Gateway 106 may be configured to communicate with an Application Server 104. In some configurations, the HSG 106 and the Application Server 104 may communicate via an Ethernet connection and protocol. In some configurations, the HSG 106 and Application Server 104 functions may be implemented in the same server or computing system 108. The computing system (e.g., 108) implementing the HSG 106 may include a microprocessor system including volatile and non-volatile memory for storing programs and data. Volatile memory may include storage elements whose contents are lost when power is no longer applied, such as random-access memory (RAM) devices. Non-volatile memory may include storage elements and devices whose contents are maintained when power is no longer applied. Non-volatile memory may include, but is not limited to, read-only memory (ROM), FLASH memory, magnetic storage media such as disk drives or tape drives, and Universal Serial Bus (USB) drives.

The Application Server 104 may provide facilities for a Web API and the resources to run the Web API. The computing system (e.g., 108) implementing the Application Server 104 may include a microprocessor system including volatile and non-volatile memory for storing programs and data. Volatile memory may include storage elements whose contents are lost when power is no longer applied, such as RAM devices. Non-volatile memory may include storage elements and devices whose contents are maintained when power is no longer applied. Non-volatile memory may include, but is not limited to, ROM, FLASH memory, magnetic storage media such as disk drives or tape drives, and USB drives. The Application Server 104 may be programmed to dynamically extract the data model from a set of nodes and render them as a Web API.

The Application Server 104 may be further configured to communicate over one or more internet or cloud connections 114 (114A, 114B, 114C). The system may be configured to communicate with one or more computing devices 116. The computing devices 116 may include tablets 116C, mobile phones 116A, and desktop/laptop computers 116B. The computing devices 116 may be configured to access one or more of the internet connections 114. The Application Server 104 may be configured to communicate with the computing devices 116 through the internet connection 114. This allows the computing devices 116 to interact with the Application Server 104 from any location that has access to the internet connection 114. The Application Server 104 may be configured to support TCP/IP communication over the Internet.

Each level of the connectivity system 100 may include programmable computing devices. In a traditional system design, software/firmware changes at one level may necessitate changes to the other connected devices. As a result, software and hardware changes must be carefully orchestrated with all the computing devices to ensure that there is no downtime or compatibility issues. This traditional model makes updating the system costly and time consuming. Disclosed herein are technologies for improving the operation of the connectively system 100.

The two underlying technologies for the connectivity system 100 are a dynamic data model and a network abstraction layer. The dynamic data model abstracts the data in a way which allows any machine to automatically configure its data interface to another machine. The network abstraction layer allows the data communication to occur in a protocol independent fashion.

Existing systems typically utilize a static data model. A static data model may be one in which the data model does not change once implemented. The data model may describe the data and characteristics of the data such as format, units, and resolution. The static data model may be implemented in each level of the connectivity system. For example, a Node may generate a specific data element and transfer the data element to the HSG. The HSG may transfer the data element to the Application Server which in turn transfers the data element to the Internet-connected computing devices. With a static model, each device must know the characteristics of the data element. For example, the devices may need to be programmed to extract the data from a particular data message that is transferred over the network. Such characteristics may be coded into each system. As a result, changing a data element causes a ripple effect of software changes throughout the system. For example, if a low-level module changes the format of a data element, all modules that rely on the data element may need to be reprogrammed to support the new format. In the solution presented, changes are made at the Node level which then has the capability to report the changes up through the system. In this manner, changes are managed automatically and Nodes change or as new Nodes are added.

An improved approach may be to define a dynamic data model. The dynamic data model can assist in automating the connectivity. Using the dynamic data model, a system architect may identify and specify the customer requirements to affect a solution. The solution may be implemented at the Node 110 level of the connectivity system 100. Software for the solution may be marked up. A schema may be generated for the markup and stored in the Node 110. The schema may define an outline or model of the data associated with each Node 110. The schema may define characteristics of the data within the model.

The schema from Node 110 may be consumed at runtime by the infrastructure (e.g., HSG 106, Application Server 104, User Interface Servers, computing devices 116). It is observed that with this architecture that data model changes at the Node level are automatically passed on to the other levels. As a result, new control and monitor processes can be added at the Node level and be quickly represented at the other levels. New features are essentially plug-and-play into the existing infrastructure. When changes are made at the Node 110 level, the schema is updated and transferred to other modules to reflect the changes. The modules may implement a schema decoding routine to determine the data elements that are present in the schema.

To achieve the dynamic data model, the connectivity system 100 may define a Protocol Agnostic Metadata Schema (PAMS) that allows the Host Services Gateway 106 to abstract the data model for any of the connected Nodes 110. The data model may be independent of any protocol or media used for communication between elements. The data model may rely on a metadata abstraction (also referred to as a schema). The schema may describe a format for the data associated with each of the Nodes 110.

The PAMS model may be derived by implementing a software solution or set of software solutions based on customer requirements and specifications. The software may be marked up to identify data that is to be included in the PAMS model. The markup may be scanned during the software build to automatically generate a schema that describes meta-data of the data model. The schema may then be used at runtime to allow the infrastructure to determine how to communicate to the control and monitor Nodes 110. The schema registration and data communications may occur between the Web Services API 102 and the control/monitor Nodes 110. The communication transactions may be mediated by the HSG 106.

The dynamic data model allows a HSG 106 to acquire the schema from each of the Nodes 110. The schema may be received and read by the HSG 106. This allows the HSG 106 to configure itself to establish protocol-independent data management services with each of the Nodes 110. The dynamic data model further allows the developer at the Node 110 level to decide which data variables are exposed to the other levels. Variables from the software may be made visible to the other modules in the system by updating the schema that is stored with each of the Nodes 110. Variables that are not exposed are not accessible.

Most modern applications communicate via some standard or proprietary media interface. In many cases, the link-layer protocol is based on some generally accepted standard. Also, there are many instances where the protocol is based on a proprietary interface. It is desirable to abstract away the protocol and media connections by introducing a session layer. This level of abstraction allows the existing interfaces and methods of communications to be preserved. The network abstraction layer may also allow for a seamless method for communicating schema-derived information over any communication channel.

A Media Independent Messaging Service (MIMS) may be defined for the Network Abstraction Layer. The MIMS may be a session layer protocol that is layered onto any existing media or protocol. The usage of the MIMS allows the Nodes 110 to virtualize the interface to the HSG 106. The MIMS may also provide a common interface for communicating with the Nodes 110.

The PAMS may define a data model for each of the Nodes 110. The Nodes 110 may be programmed to store the PAMS and to transfer the PAMS information to the HSG 106. The PAMS may define a data model that sufficiently identifies data from the Nodes 110 such that the HSG 106 can make use of the data. The advantage of the system is that the PAMS is provided by the Nodes 110 and any changes to the data structures are described by the PAMS. The Node 110 may resend the PAMS to the HSG 106 and the changes may be automatically incorporated in the HSG 106 and propagated through the communication system. This eliminates the need for reprogramming the HSG 106 when data from a Node 110 is changed. Further, additional Nodes 110 can easily be added.

The PAMS model may define a property-type pair for all instances of the data elements. Any instance of data may be modified or queried using the property-type pair. A property may be a unique record that is bound to an instance of data. The instance of data may be the represented as the actual data value. The data type may represent the structure and format of the data value.

The structure of a data instance may be represented by a type. The type can take on any programming primitive type, such as INT, FLOAT, CHAR, SHORT, LONG, etc. A collection of many primitive types may be allowed. The collection of many types as a single type may be called a RECORD. Custom types may also be allowed. A custom type may be an alias of a primitive or RECORD type. The custom type may be specified by the node architect or developer.

For example, consider an instance of pressure in a vessel in units of pounds per square inch (PSI). The Node 110 may sample an associated sensor to obtain a pressure reading, for the vessel, as 200.5 PSI. The instance of data in this case is the pressure reading for the vessel measured as 200.5 PSI. The data type for this example is represented as a floating-point number or a FLOAT type.

The constituent parts of a PROPERTY may be a PROPERTY ID and a PROPERTY NAME. The PROPERTY ID may be a unique number that is bound to a data type or instance. The PROPERTY NAME may be a string that is used to label the PROPERTY. This triplet association of the PROPERTY ID, the PROPERTY NAME, and the data type or instance is the metadata-binding.

For example, consider a data instance that is associated with a PROPERTY. The PROPERTY NAME may be "Pressure_in_tank_1." The PROPERTY ID may be assigned a hexadecimal-value of 0x10. The type for this PROPERTY may be a FLOAT type. The FLOAT type may be represented as an IEEE 754 floating point number. Table 1 shows an example of the PROPERTY-TYPE for this entry.

Another data point may describe an integral number that represents the total number of valves present at the particular Node. Table 1 includes a description of the total number of valves for this example. In this example, another PROPERTY may be introduced. The property may be named "total_number_of_valves". The property ID for this property may be assigned a hexadecimal-value of 0x11. The type for "total_number_of_valves" property may be specified as a 16-bit signed integer (e.g., SHORT)

TABLE 1

Example of a collection of PROPERTY-TYPE records

| PROPERTY NAME | PROPERTY ID | TYPE | WIDTH |
|---|---|---|---|
| Pressure_in_tank_1 | 0x00000010 | FLOAT | 4 |
| total_number_of_valves | 0x00000011 | SHORT | 2 |

Each of the PAMS property-type pairs may be listed or tabulated in a schema that may be referred to as a PAMS Application Descriptor Sheet (ADS). The schema may be encoded using the extensible Markup Language (XML). The complete tabulation of all property-type pairs may be contained in the PAMS ADS. The PAMS ADS may be a dictionary that contains the complete list of Property-Type records. The Node may store physical memory addresses of variables associated with the property data. The PAMS ADS may facilitate establishing communications between the HSG 106 and Nodes 110 and exposing the Node interface as a Web API via the Nodes 110.

The PAMS ADS may also contain the metadata information for the Node 110. The PAMS ADS may also contain other information such as UNITS expressed as strings, property grouping information, and access rights information for the properties. The PAMS ADS may be stored in non-volatile memory of the Node 110 for later transfer to the HSG 106. In some configurations, the PAMS ADS may be separately communicated to HSG 106 by the developer. The Node 110 may parse the PAMS ADS to create a database of data elements that are accessible via the communication interface.

The connectivity system 100 may include many Nodes 110. Each of the Nodes 110 may be uniquely identified. Each Node 110 may be bound to a 128-bit number that is referred to as a Universally Unique Identifier (UUID). The UUID may be used to uniquely identify each of the Nodes 110. The composition of the UUID may be as described in Table 2. The UUID may include a Vendor ID (VID), a Solution ID (SID), a Software or Firmware Version (Version), and a Node Instance ID (NIID).

TABLE 2

Example composition of a NODE UUID

| FIELD | WIDTH, (octets) | Description |
|---|---|---|
| VID | 4 | Vendor ID |
| SID | 4 | Solutions ID |
| Version | 2 | Software or Firmware version |
| NIID | 6 | Node Instance ID |

The UUID may serve two purposes. The first purpose may be to allow a unique identification for any Node 110 to the HSG 106. The second purpose may be to allow for the extraction of a PAMS ADS schema ID (ADS schema request or PAMS ADS ID). The schema ID may be used by the HSG 106 to retrieve the proper schema within the corresponding ADS repository. This allows the HSG 106 to automatically establish communications with the node. The schema ID may contain the VID, SID and Version fields of the UUID. At least one of the identifiers may change when the data interface defined by the PAMS ADS has changed. The change in identifier may prompt the HSG 106 to request transfer of the updated PAMS ADS metadata.

The ADS for a Node 110 may be stored in a secure storage location, such as the Schema Server 105, that is accessible by a qualified HSG 106. The HSG 106 may use the schema ID, that is derived from the Node UUID, to retrieve the Node ADS from the secure storage location. For example, the secure storage location may be indexed by the Node UUID. The HSG 106 may store multiple ADS information in the secure storage location for communication with a plurality of Nodes 110.

Message transactions may be structured such than none of the metadata details for any data transaction are exposed during a messaging session. The Node ADS may be configured to never expose any of its metadata details. The ordering of the PROPERTY/DATA transaction may be ad hoc and may vary via the requests generated by the HSG 106.

The lack of visibility of the Node ADS along with the ad hoc nature of each messaging transaction creates an inherently secure system. The following demonstrates this via a discussion a typical GET or SET transaction for HSG/Node transactions.

The ADS may contain all the information necessary to allow the HSG 106 to perform a GET or a SET operation with the Node 106. The property identifier values (PID_x), in the following examples may be defined as predetermined 32-bit signed integers.

The example includes adding another PROPERTY to the example shown in Table 1. The new property incorporates a custom TYPE. The new property is labeled as "node_location". Table 3 shows the updates metadata table.

TABLE 3

HSG/Node transaction example metadata

| PROPERTY | | | |
|---|---|---|---|
| NAME | ID | TYPE | WIDTH |
| Pressure_in_tank_1 | PID_1 | FLOAT | 4 |
| total_number_of_valves | PID_2 | SHORT | 2 |
| node_location | PID_3 | GPS_COORD | 16 |

Table 3 describes a new type specification for the "node_location" property. The new type is specified as the "GPS_COORD" type. Table 4 shows the "GPS_COORD" type as a set of primitive types. The primitive types may be DOUBLE or IEEE 64-bit floating point numbers.

TABLE 4

Specification of the GPS_COORD type for the example GPS_COORD

| NAME | TYPE | WIDTH |
|---|---|---|
| "LATITUDE" | DOUBLE | 8 |
| "LONGITUDE" | DOUBLE | 8 |

A GET REQUEST query by the HSG 106 to the Node 110 may involve sending the number of properties plus each of the PROPERTY IDs (PID-x). The Node 110 may respond by echoing the number of properties requested along with each PROPERTY ID followed by a list of data values.

Figure 2:
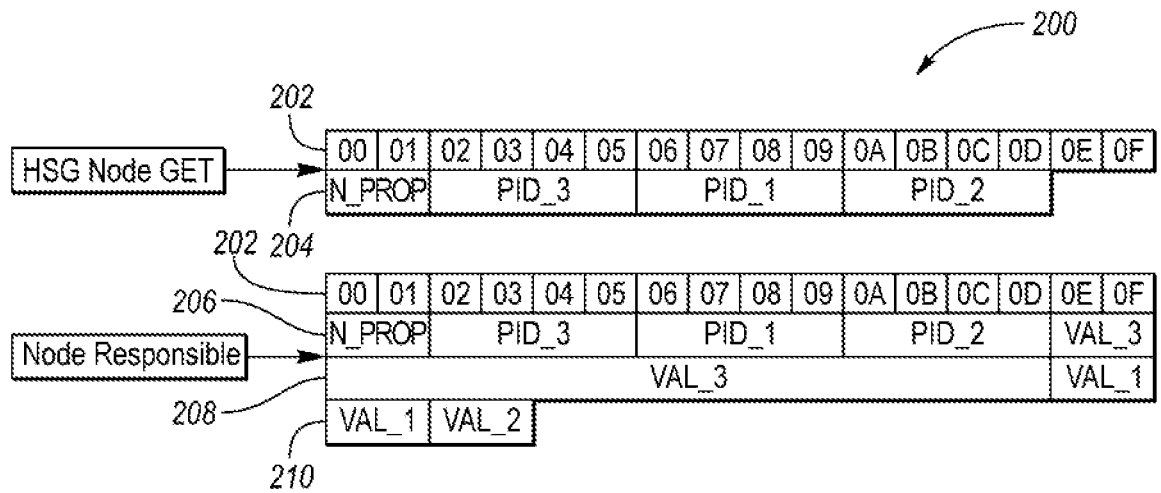
FIG. 2 depicts a possible message structure for retrieving information from a node.

FIG. 2 shows a possible message structure for the HSG 106 to Node 110 GET request transaction. FIG. 2 depicts the inherent ad hoc nature of the data request. None of the metadata structure is visible. The "hiding of information" and the ad hoc nature makes the messaging transactions inherently secure. FIG. 2 depicts a GET request transaction 200. The GET request may be a message transaction in which the HSG 106 requests data values from one of the Nodes 110. The GET request data 204 may be populated by the HSG 106 and sent to a Node 110. A GET request byte position index 202 may depict the byte-positions of each element of the GET request data 204. The N_PROP field may represent the number of properties being requested. The PID_1, PID_2, and PID_3 fields of the GET request data 204 may represent the PROPERTY_IDs that are being requested. Note that the number of PROPERTY_IDs should match the value stated in the N_PROP field. In the example, fourteen message bytes are utilized for the GET request data 204. Note that if additional PROPERTY_IDs are requested, the number of message bytes needed for the GET request data 204 will be increased.

FIG. 2 also depicts the GET response data from the Node 110. The GET response data may include a first set 206 of message bytes, a second set 208 of message bytes, and a third set 210 of message bytes. In the example, the sets of message bytes may be up to 16 bytes or octets in length. Each of the message bytes may be indexed by the byte position index 202. In addition to repeating the requested PROPERTY_IDs, the Node 110 may send the corresponding value of the PROPERTY_IDs. For example, VAL_3 represents the value of PID_3 and consumes sixteen bytes of the message. VAL_1 represents the value of PID_1 and consumes four bytes of the message. VAL_2 represents the value of PID_2 and consumes two bytes of the message. The number of bytes consumed by the values should correspond to the WIDTH for each of the PROPERTY_IDs. Some of the values may be represented by bytes in more than one of the sets. For example, VAL_1 includes data in the second set 208 and the third set 210 of bytes. In response to receiving the GET request, the Node 110 may be programmed to read the associated values of the requested PROPERTY_IDs. The Node 110 may search the ADS to determine the variable instances associated with the requested PROPERTY_IDs. The node 110 may read the value from the corresponding memory location and populate the response message.

Since HSG 106 and the Node 110 have access to the ADS information, the contents of the message can be easily decoded. The HSG 106 or Node 110 may search the ADS for the properties associated with the PID_x values that are included in the message. The associated property-type can indicate the message space consumed by each of the values corresponding to the PID_x values. This allows the Node 110 to populate the message in a consistent manner that is recognizable by the HSG 106.

Based on this interface, the HSG 106 can easily request data values for any PROPERTY_IDs that are defined in the PAMS ADS. Further, the PAMS ADS provides information as to the data length and format that will be returned by the Node 110. The HSG 106 can reference the PAMS ADS to decode the received message.

Figure 3:
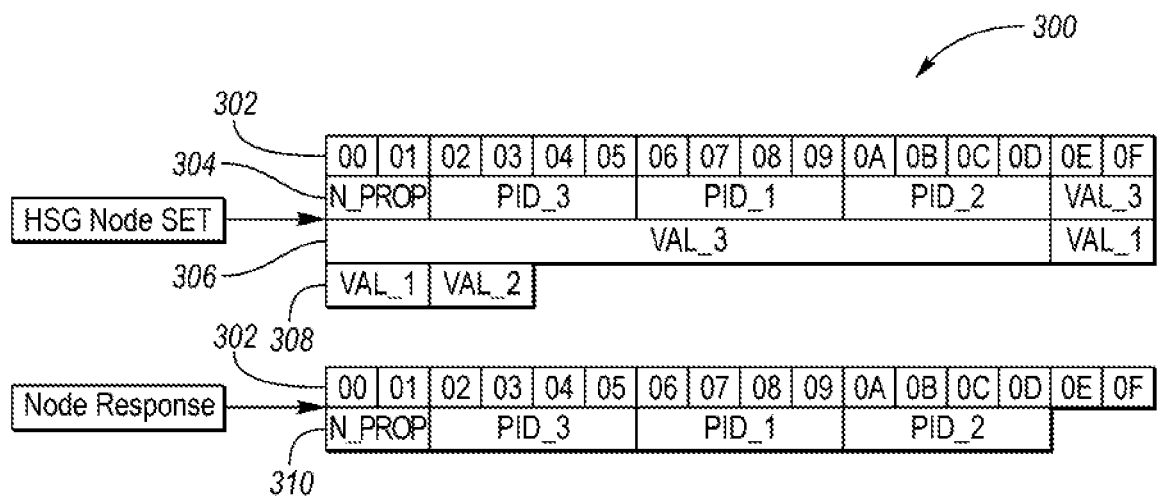
FIG. 3 depicts a possible message structure for setting data values in a node.

FIG. 3 shows a possible message structure for the HSG 106 to Node 110 SET request transaction. The Node 110 may respond with the list of property IDs to confirm the SET request message. FIG. 3 depicts a SET request transaction 300 that is designed to allow the HSG 106 to provide data values to the Nodes 110. The HSG 106 may populate data fields in the SET request message. The SET request data may include first group 304, a second group 306, and a third group 308 of data bytes. The groups may be indexed by a byte position index 302. The N_PROP field represents the number of properties being set. The PID_3, PID_2, and PID_1 fields represent the PROPERTY_IDs for which values are being provided. The VAL_3, VAL_1, and VAL_2 fields represent the data values for the corresponding PROPERTY_IDs.

FIG. 3 also depicts the SET response data from the Node 110. A SET response message 310 may include the PROPERTY_IDs that were received in the SET request from the HSG 106 and be indexed by the byte position 302. The SET response message 310 may confirm the successful receipt and processing of the SET request.

The GET and SET message transfers allow data to be transferred between the HSG 106 and Nodes 110. The GET request allows the HSG 106 to retrieve data from the Nodes 110. For example, the Nodes 110 may include process monitoring variables such as pressures or temperatures. The SET request allows the HSG 106 to set values that may control operation of the Nodes 110. For example, the SET request may be used to provide values for process control features such as a pressure setpoint or a temperature setpoint. The SET request may be used to activate or deactivate process operations. The actual type of variables that may be operated on by the GET and SET requests may be those exposed in the PAMS ADS. This allows Node developers to expose only those variables that should be exposed. For example, only variables defined in the ADS can be subject to a SET request. The visibility of variables in the Nodes 110 is defined and controlled by the Node developer. For example, the ADS may include a read only control bit associated with each PROPERTY_ID to prevent SET requests on certain PROPERTY_IDs.

In order to establish the management interface, the HSG 106 must obtain a valid ADS from the Node 110. The HSG 106 may accomplish this via an HSG/NODE ADS transaction method.

There may be two methods defined for establishing the messaging connection between the HSG 106 and Node 110. The two methods may be referred to as a PUSH connection and a PULL connection. The PULL connection method may be used when the HSG 106 and the Node 110 are co-located. In the PULL connection method, the HSG 106 may query the Node 110 and the connection may be established responsive to the Node 110 acknowledging the query.

The PUSH connection method may be used when the HSG 106 resides at an external site or on the Internet Cloud. The Node 110 may be located behind a corporate firewall. The connection establishment may be initiated by the Node 110. The Node 110 may send a query for a valid HSG 106 and the connection may be established responsive to the HSG 106 acknowledging the query.

In either the PULL connection or the PUSH connection, the query may be part of the MIMS transport protocol.

Figure 4:
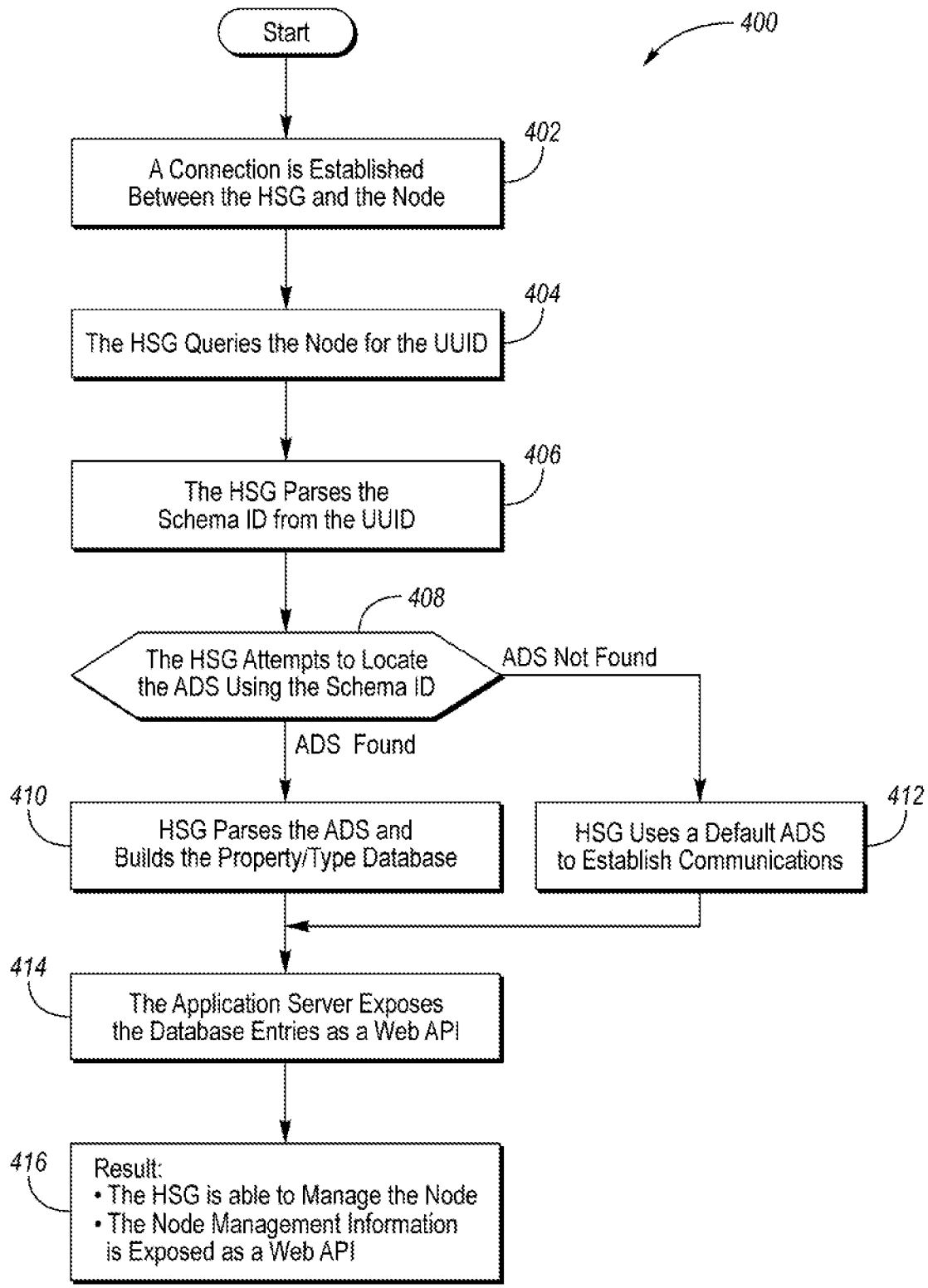
FIG. 4 is a flowchart for a possible sequence of operations for a host service gateway and a node for transferring an Application Descriptor Sheet (ADS).

The HSG 106 may retrieve the Node ADS in order to establish a data transaction session. FIG. 4 shows the flowchart 400 for a possible sequence of operations for establishing an ADS transaction session. At operation 402, a connection may be established between the HSG 106 and the Node 110. The connection may be established by either the PUSH connection method or the PULL connection method. Upon establishing the connection, operation 404 may be performed. At operation 404, the HSG 106 may query the Node 110 for the UUID associated with the Node 110.

At operation 406, the HSG 106 may parse a Schema ID from the UUID that is received from the Node 110. At operation 408, the HSG 106 may search an associated storage area to locate the corresponding ADS using the Schema ID. For example, the HSG 106 may maintain a database that includes the ADS for each of the Nodes 110 that it has established a connection to. The database may be indexed by the Schema ID. If no corresponding ADS is found, operation 412 may be performed. At operation 412, the HSG 106 may use a default ADS to establish communication with the Node 110. The default ADS may contain a list of commonly supported property-type entries. The HSG 106 may query the Node 110 for the corresponding ADS. If the corresponding ADS is found, operation 410 may be performed. At operation 410, the HSG 106 may parse the ADS and build a property/type database.

At operation 414, the application server 104 may render the database entries as a Web API and expose the Web API for use by other devices or applications. The application may be an ERP application that is executed on a web-connected device. At operation 416, the HSG 106 may manage the Node 110. The Node management information may be exposed as a Web API. The Web API may provide an interface for web servers and/or web browsers. The Web API may be used by applications connected to the connectivity system 100 for accessing information from the Nodes 110. The HSG 106 may respond to requests from the Nodes 110 and application server 104 according to the ADS. For example, the ADS may define process variables that are accessible.

The ADS dictionary may be manually generated by the systems architect. The ADS may then be implemented by the Node software developer. The ADS dictionary may be stored in memory of the Node 110 for later retrieval. The manual process may be cumbersome and prone to errors in implementation.

A method for marking up the Node software code or firmware based on the system requirements is presented. Advantages of marking up the code includes a less error-prone implementation, better diversity and accuracy of results by usage of tools used by source-level debugging systems, and "imprinting" of the code by the developer. This "imprint" is the PAMS ADS markup method.

The PAMS ADS markup technology may be implemented by the "enumerated type" construct that is included in many programming languages. The enumerated type may be a typing construct that binds a label (e.g., a string) to a fixed constant. Both the label and constant are then available in the build and run-time environments.

The enumerated type, which is a label bound to an integer constant, may be used as an alias for the PROPERTY. As presented earlier with respect to Property-Type Pairs, the PROPERTY may consist of a PROPERTY NAME and a PROPERTY ID. There are similarities between the characteristics of the PROPERTY and the Enumerated Type construct. A list of PROPERTIES may be expressed as a simple list of enumerated types. This construction may be applicable to most modern languages such as C, C++, JAVA, C#. The PAMS ADS markup method may be implemented by exposing the list of PROPERTIES as a set of enumerated types.

The markup rules for the PAMS ADS markup may applied to the software for each individual Node 110. The rules may define how each PROPERTY is bound to an instance of a variable. The instance refers to a variable within the application code that is represented by a number.

Management of the PROPERTY-TYPEs may be guided by various rules. A Node may be managed by a list of PROPERTY-TYPE pairs. A PROPERTY may consist of a PROPERTY NAME and a PROPERTY ID. A PROPERTY may be bound to a single variable instance. The data of the variable instance may be manifested as a VALUE. The structure of the VALUE may be the data type. The instance name may be rendered using the PROPERTY NAME. Each PROPERTY and fields associated with the PROPERTY may be unique for the Node 110.

Any number of Enumerated Types may be specified by creating the list of PROPERTY NAMES and PROPERTY IDS. Each PROPERTY may be part of an Enumerated Type list. The primary constraint may be that each NAME and each ID are unique within the Node context. The following is an example process that may be used for the code markup. A first step may be to define and declare each Enumerated Type list. A second step may be to ensure that each PROPERTY NAME and PROPERTY ID is unique. A third step may be to add each PROPERTY as a PROPERTY NAME to a single Enumerated Type list. A fourth step may be to bind the PROPERTY NAME to a variable instance. A fifth step may be to ensure that the markup is syntactically correct and that the code builds properly.

A string prefix may be added to a PROPERTY NAME to ensure the uniqueness of any PROPERTY NAME. Also, an integral value may be placed within the Enumerated Type to ensure the uniqueness of any PROPERTY ID. To avoid namespace contentions, a string prefix may be added to a variable instance.

A tag prefix for the PROPERTY NAME may be referred to as the property name prefix, "<pnpfix>". The tag prefix may be pre-pended to the PROPERTY NAME. This ensures the uniqueness of the PROPERTY NAME within the code namespace.

The tag prefix for the variable instance may be referred to as the variable name prefix, "<vnpfix>". The variable name prefix may be pre-pended to a bound variable. The PROPERTY NAME for the variable allows the binding of the variable instance to a PROPERTY. The "<vnpfix>" prefix is used to ensure the uniqueness of the variable name within the code namespace. The tag prefixes may also provide a search string that may be used when parsing the variable definition files.

The following is an example using the C or C++ programming language. This example lists three properties as previously described by Table 3 and Table 4. The definition and declaration of the enumerated types in the C programming language is depicted in Table 5 and Table 6. In this example, two enumerated types are declared. The enumerated types are labeled as propertyMaster_common (see Table 5) and propertyMaster_application (see Table 6). The ellipsis represents a placeholder for the list of properties.

The propertyMaster_common enumerated type may be used for Properties that are common to all Nodes. The propertyMaster_application enumerated type may be used for application specific properties. In the example presented, the "<pnpfix>" tag is defined as "_PROP_".

TABLE 5

Example of Enumerated Type for a set of COMMON PROPERTIES.

typedef enum propertyMaster_common
{
  _PROP__node_location = 0,
  ...
  propertyMaster_common_END
} propertyMaster_common;

TABLE 6

Example of Enumerated Type for list of application specific PROPERTIES typedef enum propertyMaster_application
{
  _PROP__Pressure_in_tank_1 = 0x800,
  _PROP__total_number_of_valves,
  ...
  propertyMaster_application_END
} propertyMaster_application;

The ending entry, ("propertyMaster_common_END"), may be the ending placeholder for the common property enumeration list.

Table 5 shows an offset of 0 for the common properties. Table 6 shows an offset of 0x800 for the application specific properties. This implies a block of PROPERTY IDs of 0x0000 to 0x7FF for all common properties. The application specific PROPERTY IDs may have values greater than or equal to 0x800. In the example shown, the property Pressure_in_tank_1 has a PROPERTY_ID of 0x800 and the property total_number_of_valves has a PROPERTY_ID of 0x801. Additional properties will have an incremented PROPERTY_ID.

The following description describes how to bind an instance of a variable to a PROPERTY. The PROPERTY NAME may be used as part of the label for the variable. Table 7 shows how a variable may be defined for the "node_location" property.

Table 7 introduces a user-defined type "GPS_COORD". The record defines a structure that contains two double precision numbers. The total storage requirements for the "GPS_COORD" type may be 16 octets.

TABLE 7

Example of binding a variable instance to a PROPERTY typedef struct GPS_COORD
{
  double LATITUDE:
  double LONGITUDE;
} GPS_COORD;
GPS_COORD _xmlvar_node_location;

The example defines the "<vnpfix>" tag for the variable prefix. The "<vnpfix>" tag may be defined as the string "_xmlvar_". Using the tag assures the uniqueness of the "_xmlvar_node_location" for the "node_location" within the code namespace. The variable may be used in the software. During run-time, a value may be written to the variable by operation of the software.

Table 8 shows an example of instance variable binding for the "Pressure_in_tank 1" and the "total_number_of_valves" properties. In this case, the bindings are simple global declarations. Also shown is a global "ANSI-C" initialization used for the "total_number_of_valves" property. Global initializers, ANSI modifiers, (e.g., const, volatile and static) may be allowed. The ADS scanner tool may allow for all legitimate "C" or "C++" constructs and descriptors.

TABLE 8

Example of binding variables to PROPERTIES using C types.

| float | _xmlvar_Pressure_in_tank_1; |
| short | _xmlvar_total_number_of_valves = 31; |

Figure 5:
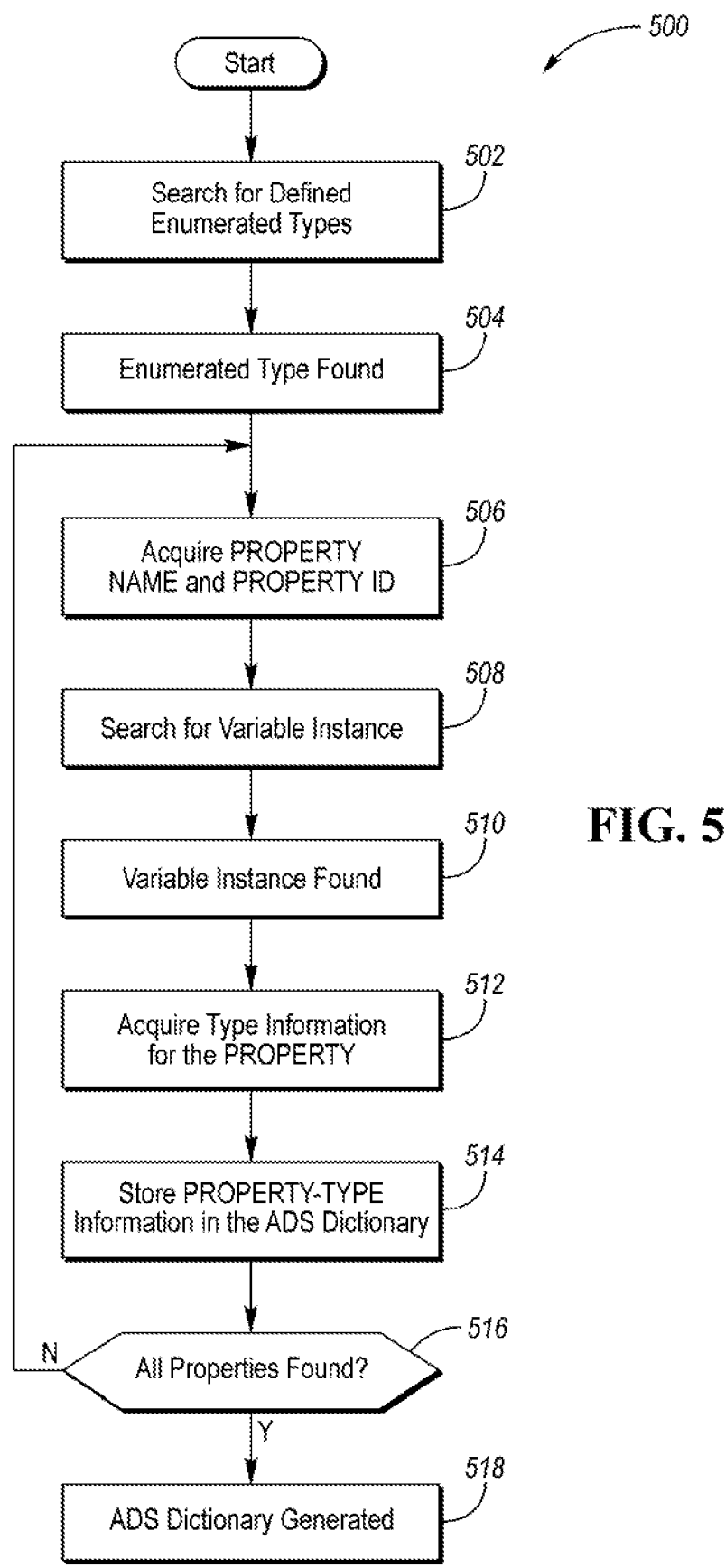
FIG. 5 is a flowchart for a possible sequence of operations for generating the ADS.

The process of generating the ADS may be automated. A program may be written that scans the program files to locate the defined PROPERTIES. The ADS dictionary generation may be described by an ADS generation flowchart 500 as depicted in FIG. 5. At operation 502, the system may search for defined enumerated types. For example, the system may search for the string for enumerated types that are defined in the software. In the C example, the system may search for the properytMaster_common and propertyMaster_application enumerated types.

At operation 504, the enumerated type is found. The system may temporarily store the associated enumerated type information for further parsing. For example, the search may yield the enumerated type of propertyMaster_common as defined in Table 5. At operation 506, the system may acquire the PROPERTY_NAME and PROPERTY_ID information. For example, the system may parse the enumerated type structure for the property name prefix, "<pnpfix>". The PROPERTY_NAME may be parsed as the portion of the string following the property name prefix. The PROPERTY_ID may be defined as the associated value. Continuing the example, the PROPERTY_NAME of "node_location" may be found with a PROPERTY_ID of zero.

At operation 508, the system may search for variable instances. The system may parse the files searching for the variable name prefix, "<vnpfix>". Further, the system may further search for a string following the variable name prefix that matches the PROPERTY_NAME.

At operation 510, the variable instance may be found. Continuing the example, the node_location as defined in Table 7 may be recognized. The system may temporarily store the associated variable information for further parsing. At operation 512, the system may acquire type information for the PROPERTY. In the example, the system may search for type information defined as GPS_COORD.

At operation 514, the property type information may be stored in the ADS dictionary. For example, the ADS dictionary may be maintained as an XML file.

At operation 516, the system may check if all properties have been found. If there are more properties to be found, operations 506 through 516 may be repeated. All properties may have been found if there are no more elements to parse in the enumerated type structure. If all properties have been found, operation 518 is performed.

At operation 518, the ADS dictionary is generated. Additional processing may be performed to complete the ADS dictionary. For example, additional XML template information may be added to the file. In some implementations, the generation of the ADS may be automated as a software program that parses the Node software files and generates the ADS.

Other languages, (e.g., C# and JAVA) may have metadata facilities built in. In these cases, the XML scanning facility may be partially supplied by the toolchain. However, the PROPERTY-TYPE binding may still be required for these cases.

In the C# case, the metadata may be marked by inheriting the Attribute class. In this case, each variable instance may be derived from the Attribute class. The PROPERTY NAME, PROPERTY ID pair may still be bound to the variable instance. The scanning and exposing of the metadata information may be done by the toolchain.

In the JAVA case, the metadata may be marked by using JAVA annotation. In this case, the JAVA annotation may be used to expose the metadata for an instance variable. As in the C and C++ examples, the PROPERTY-TYPE binding may be affected via a property list search and qualifying the PROPERTY NAME with an exposed variable instance.

Figure 6:
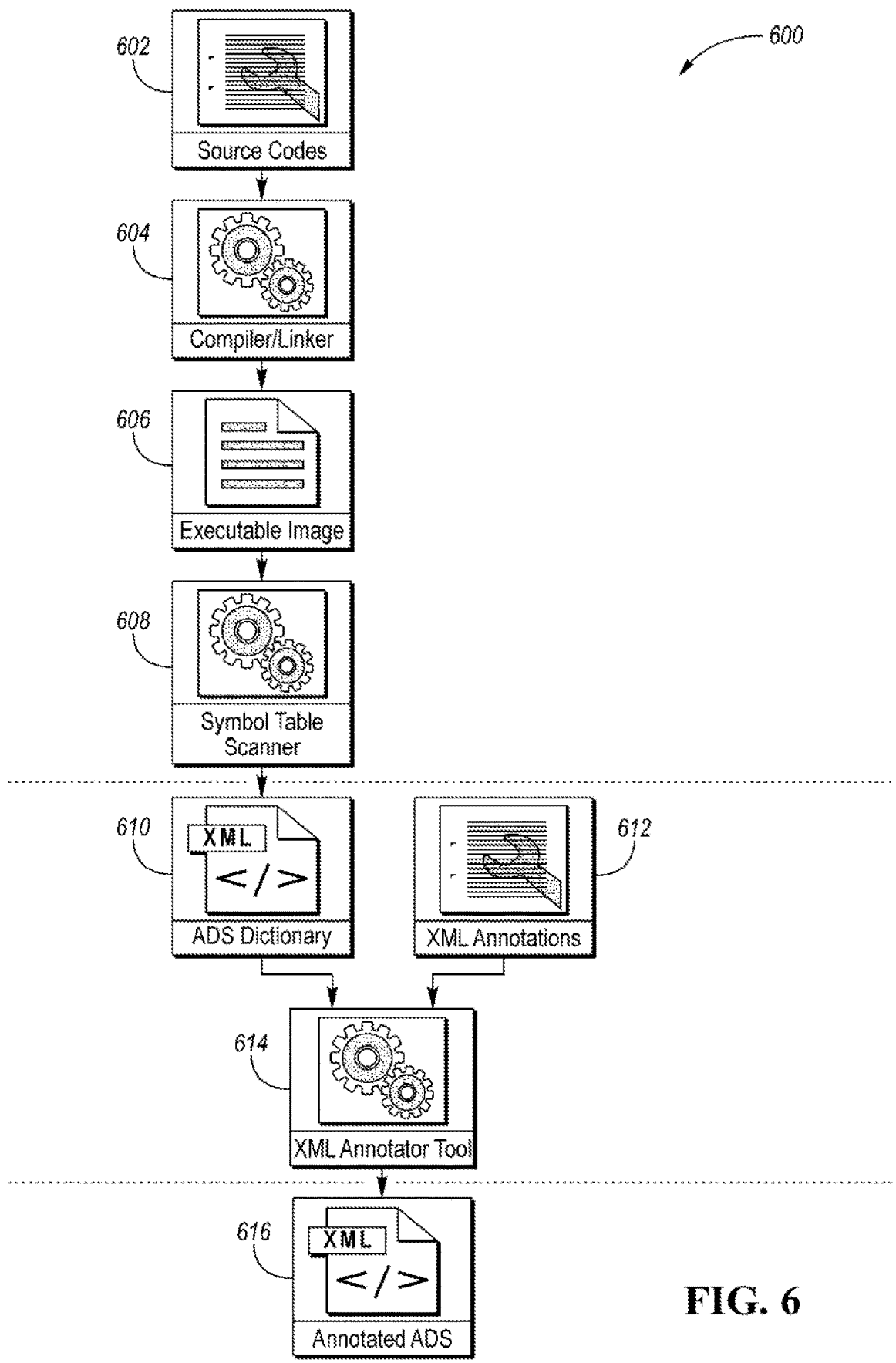
FIG. 6 is a possible workflow for generating the ADS.

FIG. 6 shows a possible markup workflow 600 for generating the ADS dictionary. At workflow 602, source code may be developed for the Node. The developer may create the project and write the firmware for the project. The source code may be constructed based on system requirements. The system requirements may define variables that are to be exposed via the ADS dictionary. Variables that are to be exposed may be defined and declared as described previously herein. The developer may mark up the code to expose the PROPERTIES/INSTANCES/TYPE information.

At workflow 604, the source code may be compiled and linked. The compilation process involves converting the individual source code files into machine executable code. The result may be multiple object files. The linking process involves combining the object files into a single executable image. During linking, addresses are assigned to program code and variables (e.g., process variables). An additional output of the linking process may be a symbol table. The symbol table may be a list of program routines and variable names with address locations. The output of the linking process may be an executable image 606 that includes symbol information.

At workflow 608, the symbol table may be scanned and parsed for ADS dictionary information. The output may be the ADS dictionary 610. In addition, XML annotations 612 may be created by the developers. At workflow 614, an XML annotator tool may combine the ADS dictionary 610 and the XML annotations 612 into an annotated ADS 616. The XML annotator tool may include compression and encryption features to reduce file size and improve security. The annotated ADS 616 may be released along with the executable image 606.

The annotated ADS 616 may be stored in non-volatile memory of the Node 110. In this manner, the annotated ADS 616 may be available to any HSG 106 that is in communication with the Node 110. Information from the annotated ADS 616 may be transferred to the HSG 106 and the exchange of data between the HSG 106 and the Node 110 may be guided by the ADS. For example, selected metadata regarding the data interface of the Node 110 may be transferred to the HSG 106.

Figure 7A:
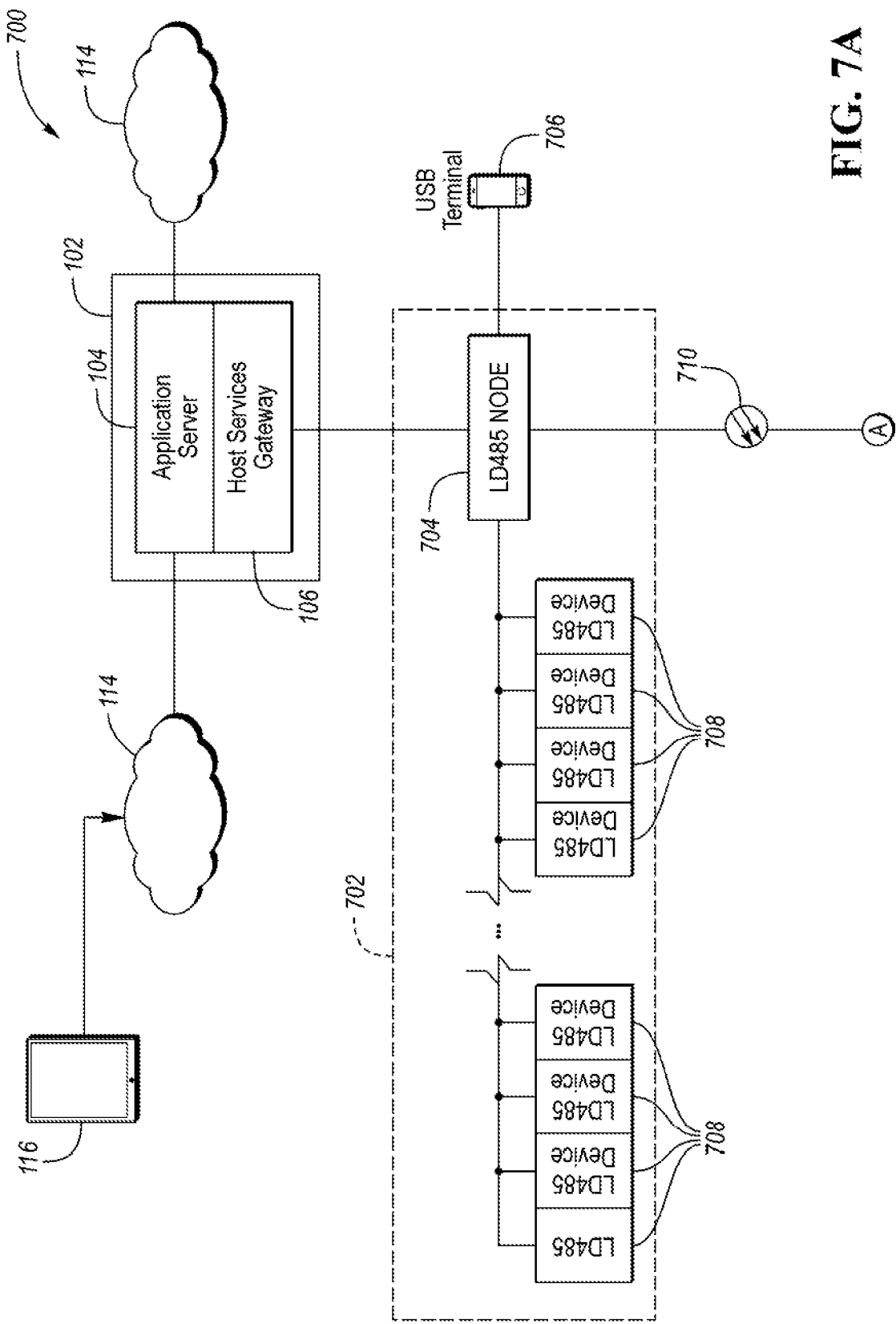
FIGS. 7A and 7B depict a block diagram of a possible system configuration in which nodes communicate with devices over a local network.
Figure 7B:
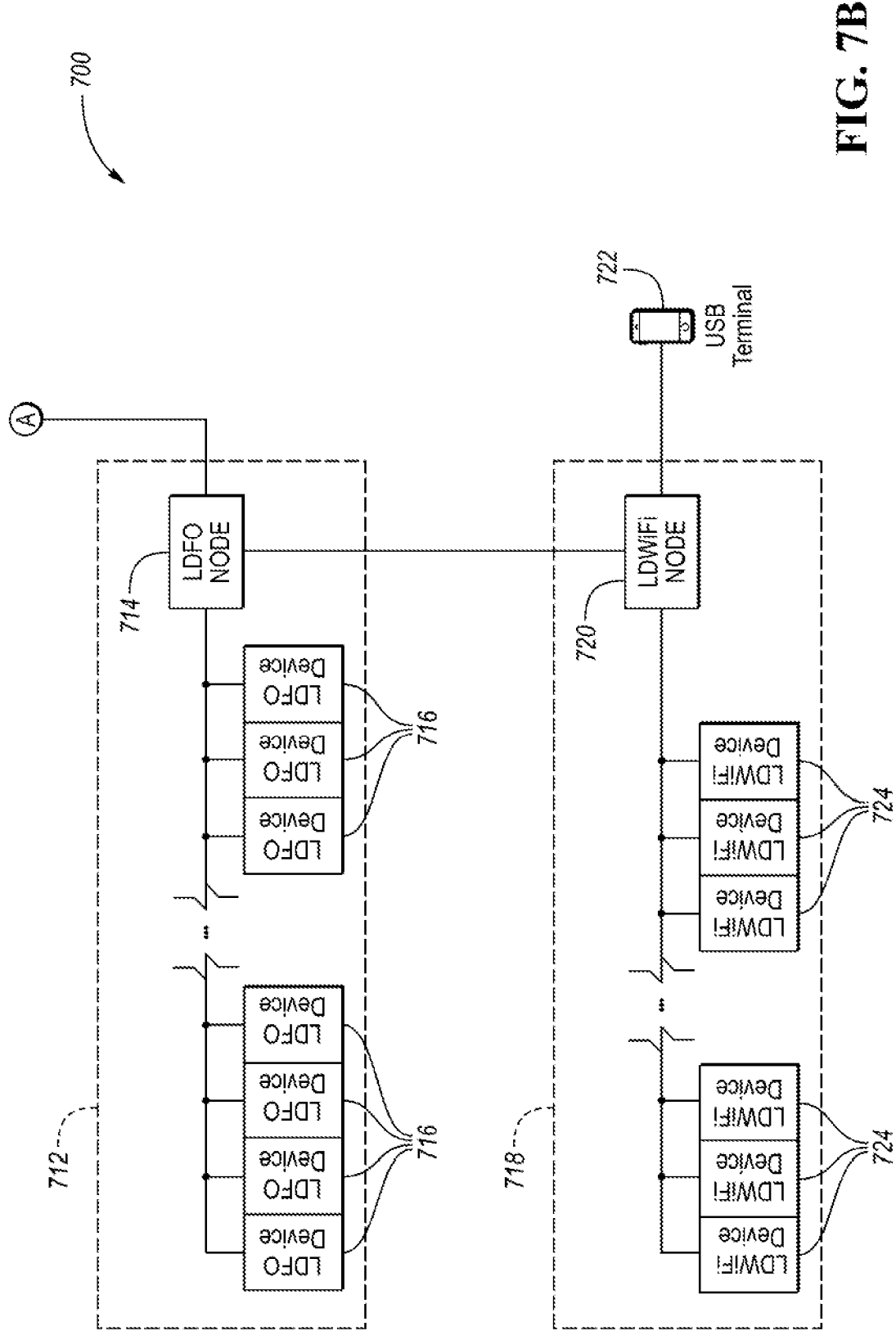

FIGS. 7A and 7B shows a possible connectivity topology 700 of a typical cluster of networking and communications systems. The Media Independent Messaging Service (MIMS) session layer may be implemented as the communications method between the HSG 106 and the Nodes 110. Also shown are the MIMS enabled local connections between USB terminals 706, 722 and the Nodes 110. The MIMS may be layered over the existing communication protocol between the HSG 106 and the Nodes 110. The Nodes 110 may communicate with local devices via independent native protocols that are independent of the MIMS.

The connectivity topology 700 may include a first local domain 702. In general, a local domain may be defined as a node that communicates with one or more local devices. The first local domain 702 may include a first node 704 that communicates with a first set of local devices 708. Communication within the first local domain 702 may be via an RS485 communication link The first node 704 may communicate with the first set of local devices 708 over the RS485 communication link using a predetermined protocol. The predetermined protocol may be a standard or proprietary communication protocol. The first node 704 may communicate with the HSG 106 via an Ethernet communication link using the MIMS session layer. A first USB terminal 706 may communicate with the first node 704 via a USB communication link and a MIMS session layer.

The connectivity topology 700 may include a second local domain 712. The second local domain 712 may include a second node 714 that is in communication with a second set of local devices 716. The second node 714 and the second set of local devices 716 may communicate over a fiber optic communication link The first node 704 may communicate with the second node 714 over a fiber-optic communication channel 710 using a MIMS session layer.

The connectivity topology 700 may include a third local domain 718. The third local domain 718 may include a third node 720 that is in communication with a third set of local devices 724. The third node 720 and the third set of local devices 724 may communicate over a wireless Ethernet channel (e.g., Wi-Fi). The third node 720 may communicate with the second node 714 via an Ethernet connection using the MIMS session layer. A second USB terminal 722 may communicate with the third node 720 via a USB communication link and a MIMS session layer.

Figure 8:
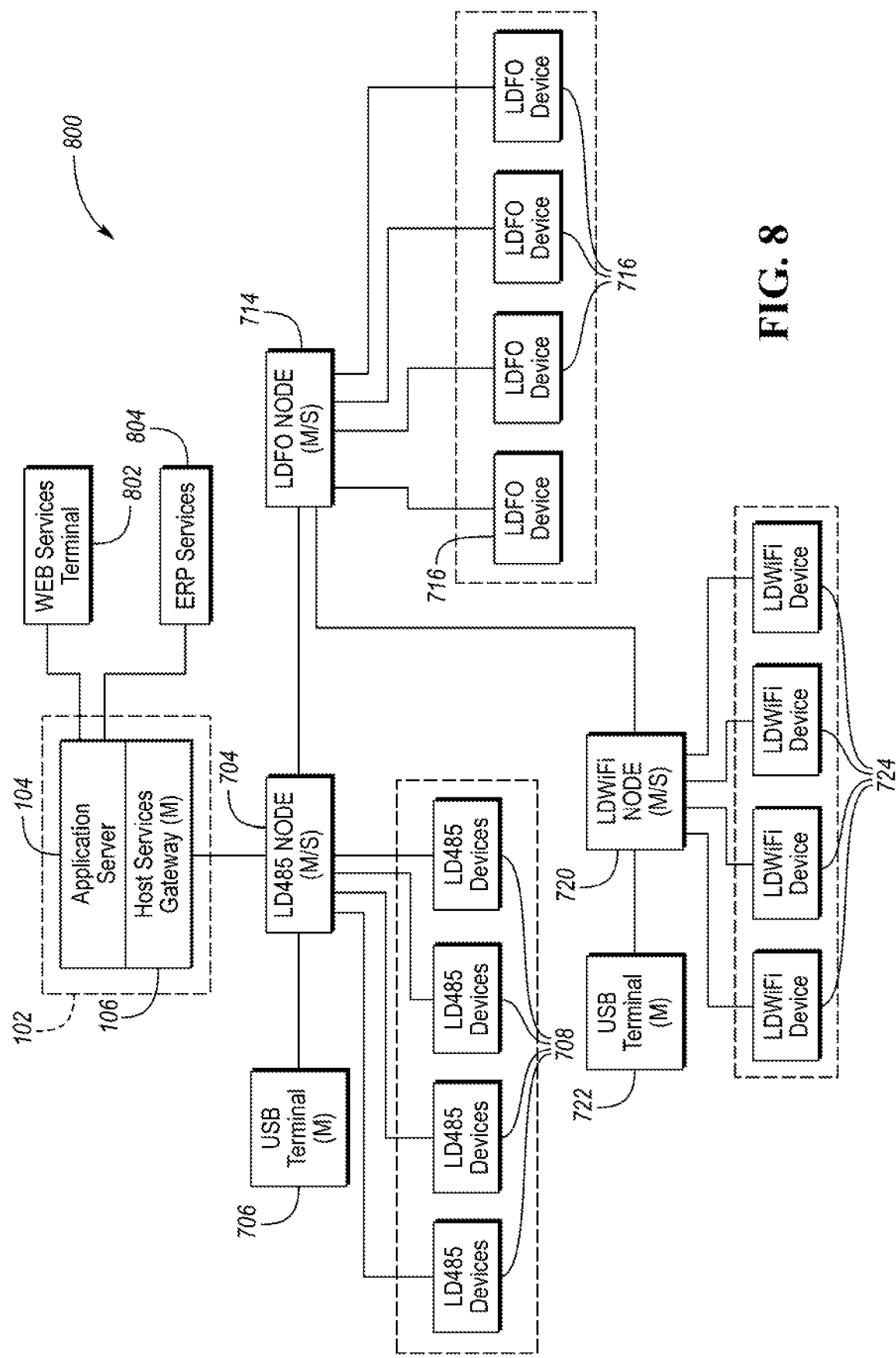
FIG. 8 is a block diagram of a possible connection configuration including master and slave nodes.

FIG. 8 provides alternative representation 800 of the connectivity topology 700 further describing the interconnection of the local domains. Each of the first node 704, the second node 714, and the third node 720 may be a coordinator/controller for a specific Local Domain. Each of the Local Domains (LD) may have some common characteristics. MIMS may be implemented as a session layer on the Local Domain. MIMS may also be implemented as the data link layer for the Local Domain. The LD nodes may be a single MASTER with multiple SLAVE connections. Each MIMS LD may support a specific fixed size data frame transfer. Some LD nodes may support a multiple LD routing capability.

FIG. 8 also depicts that nodes and devices may operate in a Master (M) or Slave (S) mode. The nodes and devices may also operate as both a Master and a Slave (M/S). The HSG 106 may operate as a Master. The first node 704 may operate as a Master/Slave. The first USB terminal 706 and the second USB terminal 722 may operate as Master nodes. The second node 714 and the third node 720 may operate as Master/Slave nodes.

A Web Services Terminal 802 may be in communication with the Application Server 104. The Application Server 104 may also be in communication with ERP Services 804. The ERP Services or ERP Applications may be one or more applications that are executed on an external device or terminal. The ERP Application may include or be associated with a user interface that allows a user to access various features. For example, the ERP Application may permit read and/or write access to process variables that are defined in the Nodes.

It is desired to maintain all existing protocols for any local domain. The system may allow a seamless transport management of control and status variables in a protocol-independent fashion. Features of the MIMS session layer may allow forwarding to any node to communicate to another master/slave node. Each of the SLAVE nodes may acknowledge any MASTER node requests. All CONTROL fields may be in network byte order (BIG ENDIAN). PAYLOAD fields may be either BIG ENDIAN or LITTLE ENDIAN order. The frame length may be fixed and dependent on the characteristics of the associated Local Domain. Frames may be automatically aggregated to maximize media bandwidth utilization. The MIMS session layer may allow for multi-frame block transfer of data.

Figure 9:
FIG. 9 is a possible message structure for a Media Independent Messaging Service (MIMS) frame.

FIG. 9 shows a possible layout 900 of a MIMS frame. Each frame may be fixed in length. The length of the frame may be dependent on the characteristics of the LOCAL DOMAIN. Individual octets within the frames may be indexed by a hexadecimal octet position index 902 and/or a decimal octet position index 904. Octets with the MIMS frame may also be indexed by a hexadecimal address 906 and/or a decimal address 908. For example, the position within the MIMS frame of any byte of information may be determined by using the hexadecimal octet position index 902 and the hexadecimal address 906.

The maximum allowable frame size of a MIMS frame may be 1056 octets. The minimum MIMS frame size is 128 octets. The frame size for any MIMS frame may be fixed by the constraints of the local domain.

The MIMS frames may include some common fields. Each MIMS frame may include a 32-octet header and a payload section. The payload section encapsulates the data. There may be six fields that are common for all MIMS frames. The common fields for any MIMS frame may be summarized in Table 9.

TABLE 9

MIMS header common fields

| Field | Offset | Size (octets) | Description |
| --- | --- | --- | --- |
| SY | 0 | 2 | SYNC = unique agreed upon 2-octet number |
| CRC32 | 2 | 4 | 32-bit CRC |
| PTYPE | 6 | 2 | Protocol type and payload size |
| MFC | 8 | 2 | Media Frame Control byte |
| CSW | 10 | 2 | Control and status word |
| FTAG | 12 | 2 | Frame TAG identifier |

A Frame SYNC (SY) field may be a two-octet sync field that is included at the start of the frame. The values for this field may be some unique agreed-upon two-octet number. This field may indicate the start of the MIMS frame. A Frame Check (CRC32) field may following the SY-field and may be a four octet CRC32 field. The CRC32 may be calculated from the octets starting at offset 0x06 to the end-of-frame octet inclusive. The polynomial used for the CRC32 calculation may be 0x04C11DB7.

Figure 10:
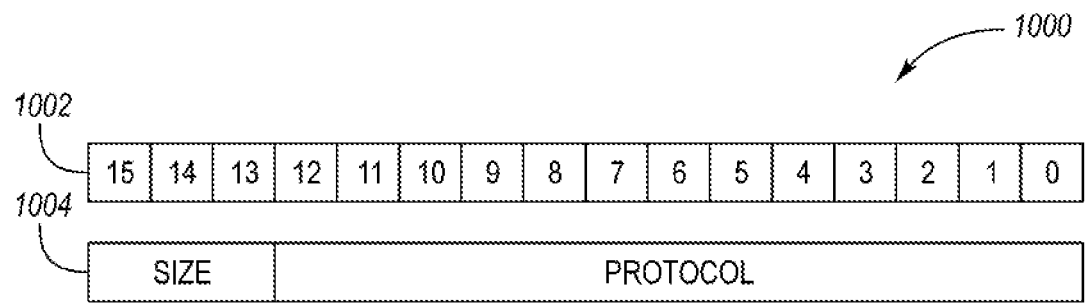
FIG. 10 is a possible structure for a protocol type message field.

A Protocol Type (PTYPE) field may be a two-octet field that signifies the protocol and the payload size. FIG. 10 shows a map 1000 of a PTYPE bit-field definition 1004 as indexed by a bit position index 1002. The PTYPE field may remain un-altered during any forwarding, aggregation or block transfer processes. The PTYPE field may include a three-bit SIZE field and a thirteen-bit PROTOCOL field.

The SIZE field may indicate a Local Domain MEDIA FRAME size. There may be four SIZE values supported by the protocol. The payload sizes may be as shown in Table 10.

TABLE 10

PTYPE.SIZE bit field definitions

| | PAYLOAD | |
| --- | --- | --- |
| SIZE | OCTETS | Type |
| 0 | reserved | reserved |
| 1 | 96 | MIMS_128 |
| 2 | 224 | MIMS_256 |
| 3 | 512 | MIMS_544 |
| 4 | 1024 | MIMS_1056 |
| 5 . . . 7 | reserved | reserved |

The PROTOCOL field may have allowed values as shown in Table 11. The protocol type allows for a wide variety of addressing modes and various types of parsing rules for a frame. A full description of each protocol is described herein. Protocol types with values less than 0x7FF may be reserved for all protocols supporting MIMS addressing. Protocol types with values within the range (0x800 . . . 0xCFF) may be set aside for any vendor or user specific cases. There may be two common PROTOCOL types defined. The common protocol types may be defined as the CAPABILITY and PROPERTY types. Both of the common protocols are described herein.

TABLE 11

COMMON MIMS addressing protocols

| VALUE | PROTOCOL | Address | Description |
| --- | --- | --- | --- |
| 0x0000 | CAPABILITY | MIMS | Capability description protocol |
| 0x0001 | PROPERTY | MIMS | GET/SET property-value pair using MIMS addressing |

Figure 11:
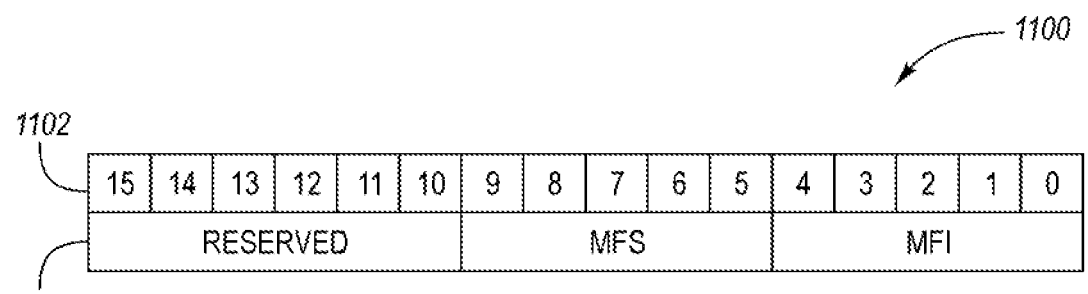
FIG. 11 is a possible structure for a media frame control message field.

Referring again to FIG. 9, a media frame control (MFC) field may be defined that allows devices to transport frames using the most efficient media/bandwidth utilization. FIG. 11 shows a map 1100 of a MFC bit-field definitions 1104 as indexed by a bit position index 1102. The MFC field 1104 may define a five-bit field for a Multi-Frame Size (MFS) field that may be a non-zero value for a multi-frame transfer. The MFC field 1104 may define a five-bit field for a Multi-Frame Index (MFI). The operational aspects of the MFC 1104 field are described herein.

Figure 12:
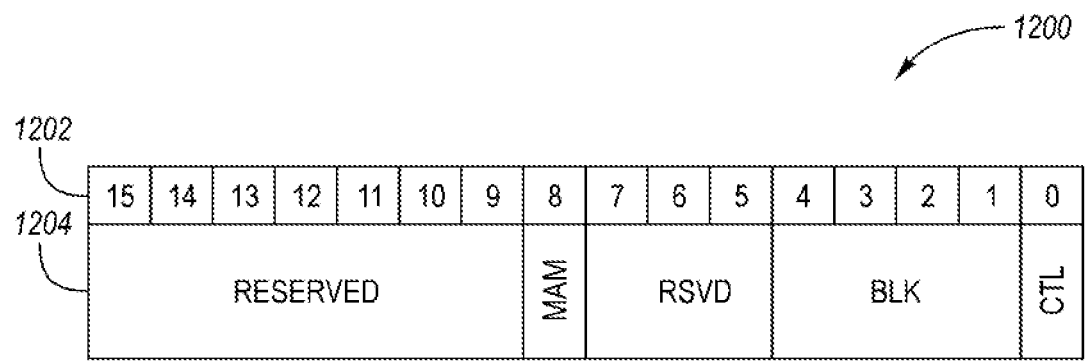
FIG. 12 is a possible structure for a control and status word message field.

A control and status word (CSW) field may be defined that enables the MASTER to send control information to the SLAVE. For a MASTER to SLAVE transfer, the CSW field may represent a control word. For a SLAVE to MASTER transfer, the CSW field may represent a status word. The CSW field may also be used as part of a BLOCK transfer mechanism for the protocol. The CSW field may be divided into a set of bit fields. The definitions of the bit fields for the MASTER to SLAVE transaction may be as shown in FIG. 12. FIG. 12 shows a map 1200 of a CSW bit-field 1204 as indexed by a bit position index 1202.

The CSW bit-field 1204 may define a control/protocol direction bit (CTL) The CTL bit may allow a MASTER to send a GET or SET request to a SLAVE device. Table 12 shows the possible definitions for the CTL for MASTER to SLAVE transactions. For example, the CTL bit being set to zero may indicate that the MASTER is requesting a GET transaction from SLAVE. The CTL bit being set to one may indicate that the MASTER is requesting a SET transaction to the SLAVE.

TABLE 12

MASTER to SLAVE CTL bit definitions

| CTL | Description |
| --- | --- |
| 0 | MASTER requests a GET transaction from the SLAVE |
| 1 | MASTER requests a SET transaction to the SLAVE |

The CSW bit-field 1204 may define a block transfer size/enable (BLK) field. Multi-frame block transfers may be supported by all protocol types. The rationale for doing this may be to allow for more efficient transfers of larger blocks of data. Instead of requiring the SLAVE to acknowledge each individual MASTER request, the multi-frame block transfer requires the SLAVE to acknowledge a set of frames for a single block transfer. The BLK field may have a length of four bits.

The MASTER may send a block transfer request via the BLK field. A BLK field value of zero may indicate a normal frame transfer with a single SLAVE acknowledge. A BLK field with a non-zero value may indicate a block transfer and a frames-per-block request. Table Table 13 shows a possible definition for the BLK field for a MASTER to SLAVE block transfer request. A non-zero value may be indicative of a number of frames per block.

TABLE 13

MASTER to SLAVE BLK block transfer request definitions

| BLK | N | Description |
| --- | --- | --- |
| 0 | 0 | Block transfer mode disabled, normal frame transfer |
| 1 . . . 15 | 2 . . . 16 | N = FRAMES PER BLOCK = (BLK + 1) |

The CSW-bit field 1204 may define a MIMS Addressing Mode (MAM) field. The MAM field may only apply to PROTOCOL types represented by a value less than 0x800. There may be two types of MIMS addressing available. The two modes may include static addressing and dynamic addressing. A value of zero may select the static MIMS addressing mode. A value of one may select the dynamic MIMS addressing mode.

The static addressing mode may use a 6-octet MIMS address that is statically assigned. The resolution of the MIMS address may be determined via a local domain address resolution or set of rules.

The dynamic addressing mode may use a 6-octet MIMS address that is assigned to a SLAVE by the local domain MASTER. In this case, the upper three octets may be statically assigned by the MASTER. The MASTER may randomly generate the lower three octets and combine them to form the full six-octet MIMS address. The assignment of the dynamic address may be done in such a way to assure that there is no address contention within the local domain.

There may be a case where an upstream MASTER detects a MIMS address conflict within the entire network. In this case, the upstream MASTER can signal to the local domain MASTER to reassign the SLAVE MIMS address.

Figure 13:
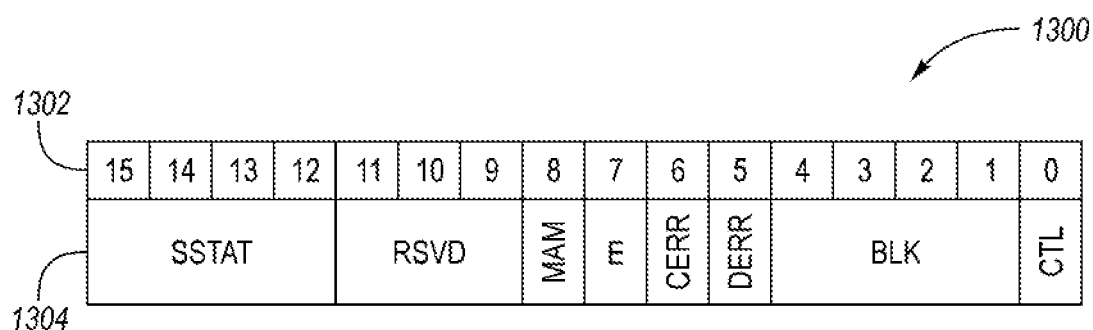
FIG. 13 is a possible structure for a status message field.

The definitions of the bit fields for the SLAVE to MASTER transaction may be as shown in FIG. 13. FIG. 13 shows a map 1200 of a Status bit-field 1304 as indexed by a bit position index 1302. SLAVE to MASTER status and acknowledgement may be affected via the control and status CSW field.

In this mode, the CSW-field may define a SLAVE status field (SSTAT). The SLAVE status field may be a PROTOCOL type status field. A zero in this field may indicate that the transaction was processed with no errors. A non-zero value in this field may indicate that an error has occurred during the processing of the transaction.

The SLAVE to MASTER CSW-field may include a MIMS Addressing Mode (MAM) field. The definition for this field may be the same as described previously for the MASTER to SLAVE transaction. In this direction, the SLAVE may return the proper setting for the MAM bit as assigned by the local domain MASTER.

The CSW-field may define a SLAVE EVENT notification signal (E). For a response to a MASTER to SLAVE message, the E field may be set to zero. If capable, a SLAVE may generate an unsolicited message or event. In the situation where the SLAVE cannot generate an asynchronous message, the SLAVE must wait for the MASTER to query. At this point the SLAVE may substitute an event frame for the response. The connectivity system may define a set of rules for event or unsolicited messages. For example, any SLAVE may send an event message to the MASTER within the local domain. An EVENT or unsolicited message may be marked by setting the E-field to one. An EVENT message may always a single MEDIA FRAME. The MASTER may not acknowledge any received event message. A MASTER may receive the message and may forward the message to all MASTERS in the upstream direction. A SLAVE event frame may always be sent as a single MEDIA FRAME.

The CSW-field may define a control transfer error status (CERR) field. The control transfers error status may be signaled via the CERR field. The CERR field may signal an error with the header or a control transaction. A zero value may indicate a successful control transfer response. A non-zero value may indicate an unsuccessful control transfer response.

The CSW-field may define a data transfer error status (DERR) field. The data transfer status may be signaled via the DERR field. The DERR field may signal an error within the payload. The protocol application layer may control the operation of the DERR field. A zero value may indicate a successful data transfer response. A non-zero value may indicate an unsuccessful frame transfer response.

The CSW-field may define a SLAVE block transfer size (BLK) field. The SLAVE to MASTER BLK field may be filled with the original block transfer block size as requested by the MASTER. The bit field definitions may be the same as shown in Table 13.

The CSW-field may define a SLAVE get/set response indication (CTL) field. The CTL bit-field may indicate a GET or SET response. A possible definition for this bit field is shown in Table 14.

TABLE 14

SLAVE to MASTER CTL Control bit field response

| CSW.CTL | Description |
| --- | --- |
| 0 | SLAVE GET response |
| 1 | SLAVE SET response |

Figure 14:
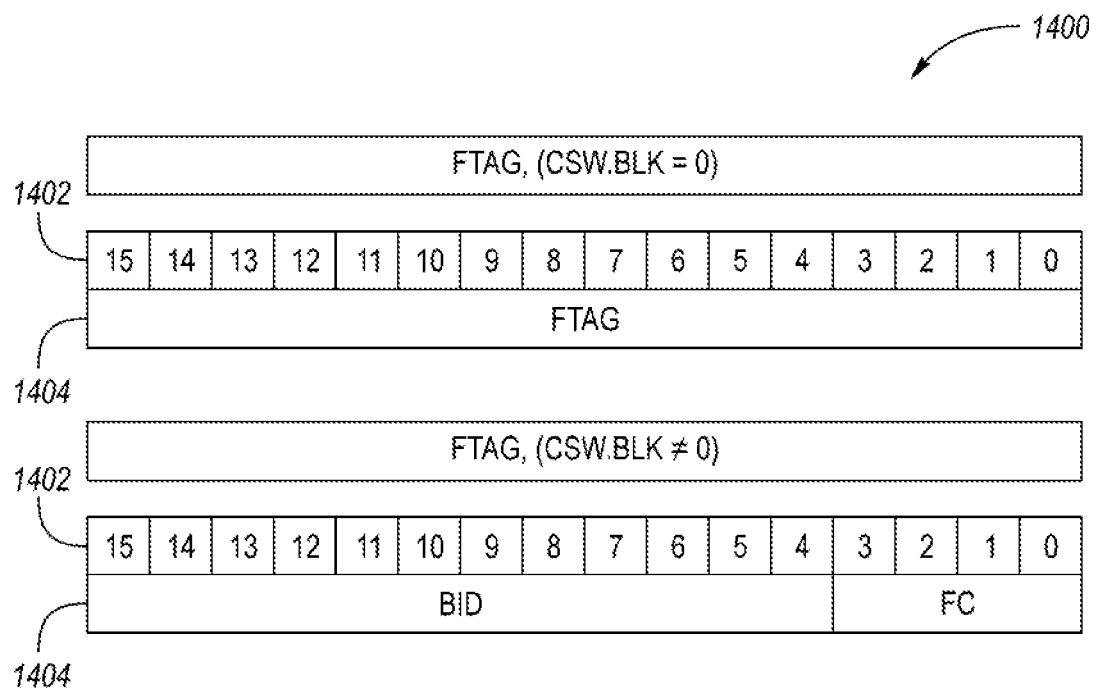
FIG. 14 is possible structure for a frame tag message field.

Referring again to FIG. 9, a frame tag (FTAG) field may be defined. The FTAG field may identify a frame sent from the MASTER. The FTAG field may define two different formats depending on whether the frame is part of a BLOCK transfer or a single frame transfer. Rules for setting the FTAG field may be defined. For example, The FTAG may be a frame sequence identifier. The FTAG may be a frame sequence number when the BLK is set to zero. FTAG may contain a block ID (BID) bit-field and frame count (FC) bit-field for block transfers (e.g., BLK ≠0). FIG. 14 depicts a map 1400 of a FTAG bit field 1404 indexed by a bit position index 1402 when the BLK value is zero. FIG. 14 also depicts the FTAG bit field 1404 indexed by bit position 1402 when the BLK value is non-zero that consists of a BID field and a FC field.

The connectivity system may define how frame transfers are to occur. MIMS frames may be fixed in length. There may be two types of frames used within the MIMS architecture. There is the actual frame that is transported on the media. This frame may be referred to as the MEDIA FRAME.

There may be a frame that may or may not be the same size as the MEDIA FRAME. These frames contain all control information within the header which allows for routing and block transfers. This frame may be referred to as the PROTOCOL FRAME. The MEDIA FRAME may transport the PROTOCOL FRAME. The PROTOCOL FRAME may carry the information that is parsed by the SLAVE nodes.

Each local domain type may be specified to support a fixed number of octets for a transfer. The frame that is transported by the node physical layer (PHY) may be the MEDIA FRAME. The MEDIA FRAME may follow certain rules. The node physical layer transports information packaged into a MEDIA FRAME. The MEDIA FRAME length may be set by the transport constraints of the Local Domain or MEDIA. The MEDIA FRAME uses the MIMS format. All CRC32 values may be calculated and stamped onto a MEDIA FRAME.

The PROTOCOL FRAME size, in addition to the constraints of the MEDIA and the MFC field are used to moderate all frame transfers. The PROTOCOL FRAME size may be set by the originating MASTER. The MFC field may be modified by the MASTER device. FIG. 11 shows the layout of the MFC field. The MFC field may define two bit-fields. The bit-fields are summarized in Table 15.

TABLE 15

Bit-field summary for the Media Frame Control (MFC) field

| Bit-field | Name | Description, (summary) |
| --- | --- | --- |
| MFS | MEDIA frame Count | Total number of frames for a MEDIA FRAME transfer |
| MFI | MEDIA frame Index | MEDIA FRAME transfer index |

Only MASTER devices may be allowed to modify the MFC field. Any targeted SLAVE device will echo this field. The MEDIA FRAME transfer index (MFI) may be used to keep track of the currently transmitted MEDIA FRAME. The MFC field may adhere to certain rules. Only routing capable devices may be allowed to modify the MFC field. The transfer may be split into multiple transfers if the PROTOCOL FRAME size is greater than the MEDIA FRAME size. Only MASTERS may be allowed to split a PROTOCOL FRAME into multiple MEDIA FRAMES. A PROTOCOL FRAME with length not equal to the MEDIA FRAME may be encapsulated. A PROTOCOL FRAME with length equal to the MEDIA FRAME is not encapsulated.

The MEDIA FRAME transfer Count MFS bit field represents the total number of frames to transmit for a multi-frame transfer. A value of zero indicates a single frame transfer.

In the multi-frame transfer; the total number of transferred MEDIA FRAMES is equal to a value of MFS+1. The equation for the total number of transferred MEDIA FRAMES is represented as Eqn. 1. The entire PROTOCOL FRAME may be encapsulated by multiple transfers of the MEDIA FRAMES.

$$MFS = \text{INT}\left(\frac{PROTOCOL\_FRAME_{size}}{MEDIA\_FRAME_{payload\ size}}\right) \quad (1)$$

where MFS is one less than the total number of MEDIA FRAMES to transport, $PROTOCOL\_FRAME_{size}$ is the entire protocol frame size including the header, and $MEDIA\_FRAME_{payloadSize}$ is the MEDIA FRAME size minus 32.

The MFI bit-field may be an index that tracks MEDIA FRAME transfers. The first transmitted MEDIA_FRAME may be indexed as zero. The MFI bit field may be incremented for each subsequent MEDIA FRAME transfer. The MFI bit field may be set to zero for a single MEDIA FRAME transfer.

The PROTOCOL FRAME may have any valid MIMS payload length. The length may be set by the device's data link layer in the SIZE field. This allows any device to split or aggregate protocol frames into a set of MEDIA FRAMES. This maximizes the efficiency of transport across several Local Domains. A PROTOCOL FRAME may follow several rules. PROTOCOL and MEDIA FRAMES for protocol types 0x0800 ≤protocol <0xFFFF are identical. The SIZE field may be set by the sourcing MASTER. A targeted SLAVE device may respond with the PTYPE SIZE field as set by the sourcing MASTER.

Any generated PROTOCOL FRAME in which the frame length is equal to the MEDIA FRAME length is not encapsulated. In this case, the PROTOCOL FRAME and the MEDIA FRAME are identical. The frame is transported as a single frame transfer.

Any generated PROTOCOL FRAME in which the frame length is less than the MEDIA FRAME length will be issued as a single MEDIA FRAME transfer. The PROTOCOL FRAME is completely encapsulated in the MEDIA FRAME payload. The small frame transfer may be subject to some rules. For example, the PROTOCOL FRAME, including the header, is completely encapsulated in the MEDIA FRAME payload. Any required excess octets may be padded to accommodate a single MEDIA FRAME transfer.

The PROTOCOL FRAME may be split into multiple MEDIA FRAME transfers when the PROTOCOL FRAME length exceeds the MEDIA FRAME length. The total number of MEDIA FRAME transfers may be split to an integral multiple of the number of MEDIA FRAMES required to transmit the entire PROTOCOL FRAME. The multi-frame transfer may be subject to some rules. For example, the entire PROTOCOL FRAME is fully encapsulated in the MEDIA FRAME payloads. The transfers are split into MFS+1 MEDIA frames as per the MFS rules. Each MEDIA FRAME transfer may be indexed using the MFI bit-field. The receiving device shall re-assemble the MEDIA FRAMES into a PROTOCOL FRAME using the MFC field information.

The following illustrate the frame transport rules via a set of use cases. In these sections, the set of scatter-gather rules are illustrated.

Figure 15:
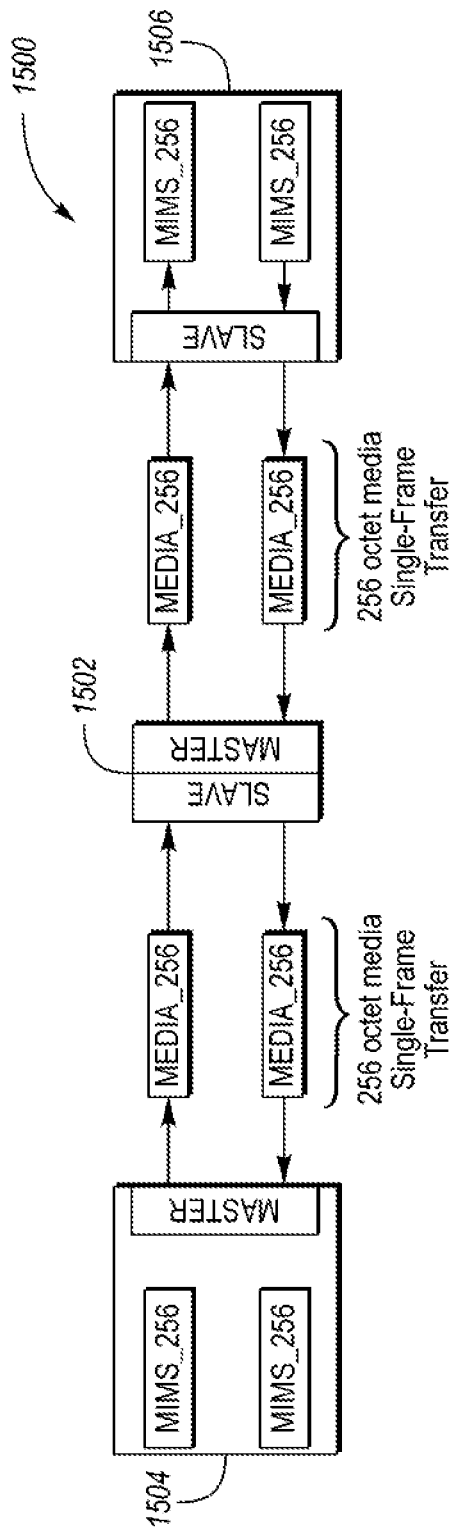
FIG. 15 depicts a communication transaction in which a protocol frame length is the same as a media frame length.

FIG. 15 shows a first use case 1500 in which the PROTOCOL FRAME length exactly matches the MEDIA FRAME length. The transfer and forwarding are both single frame transfers where the frame control fields are setup by the originating MASTER as shown in Table 16. In this case, the PROTOCOL FRAME and MEDIA FRAME are IDENTICAL.

TABLE 16

MASTER MFC field setup for PROTOCOL_FRAME length = MEDIA FRAME length

| Field | Value | Comments |
|---|---|---|
| PTYPE.SIZE | 2 | MIMS_256 |
| MFC.MFS | 0 | Setup for single frame transfer |
| MFC.MFI | 0 | Don't care |

In this case, a MASTER Node 1504 may be configured to transmit with a PROTOCOL FRAME size of 256 octets (e.g., MIMS_256). The message may be transmitted to a M/S Node 1502 with a MEDIA FRAME length of 256 (e.g., MEDIA_256). The M/S Node 1502 may transfer the message to a SLAVE Node 1506 with a MEDIA FRAME length of 256 octets (e.g., MEDIA_256). The SLAVE Node 1506 may send a response with MEDIA FRAME length of 256 octets (e.g., MEDIA_256) to the M/S Node 1502. The M/S Node 1502 may transfer the message to the MASTER Node 1504 with a MEDIA FRAME length of 256 octets (e.g., MEDIA_256).

Figure 16:
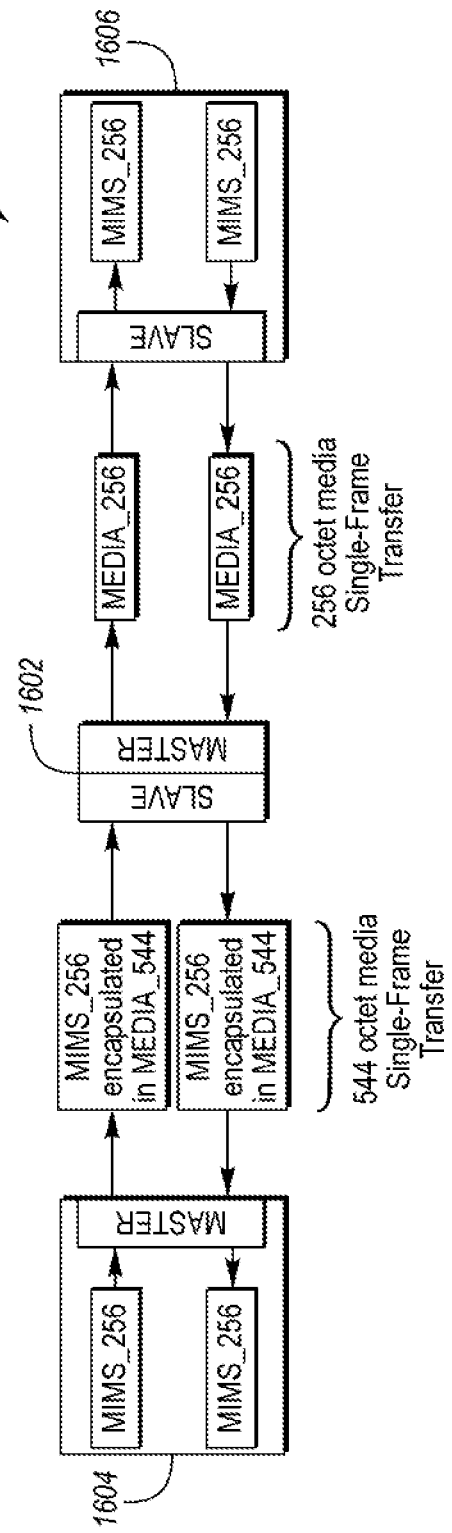
FIG. 16 depicts a communication transaction in which the protocol frame length is less than the media frame length.

FIG. 16 shows a second use case 1600 in which the PROTOCOL FRAME length is less than the MEDIA FRAME length. The 256-octet PROTOCOL FRAME may be entirely encapsulated into a 544-octet MEDIA FRAME. This frame is transmitted as a single 544 octet MEDIA FRAME. In the second use case 1600, the communication channel between a MASTER Node 1604 and a M/S Node 1602 has a MEDIA FRAME length of 544 octets.

The transport between the M/S Node 1602 (routing device) to a SLAVE Node 1606 (SLAVE target device) may have a MEDIA FRAME length constraint of 256 octets. The M/S Node 1602 may forward the 544-octet MEDIA FRAME as a 256-octet MEDIA FRAME to the SLAVE Node 1606. This is still a single transfer case. The setup for both the sourcing and forwarding MASTER is shown in Table 17. A response from the SLAVE Node 1606 may be transferred to the M/S Node 1602 with a MEDIA FRAME length of 256 octets. The M/S Node 1602 may transfer the response message to the MASTER Node 1604 with a MEDIA FRAME of 544 octets.

TABLE 17

MASTER MFC field setup for PROTOCOL_FRAME length < MEDIA FRAME length

| Field | Value | Comments |
|---|---|---|
| PTYPE.SIZE | 2 | MIMS_256 |
| MFC.MFC | 0 | Setup for single frame transfer |
| MFC.MFI | 0 | Don't care |

Use cases in which the PROTOCOL FRAME length is greater than MEDIA FRAME length may be best described by two use cases. The use cases may be a described as single frame to multi-frame forwarding and the multi-frame launch to single-frame forwarding.

Figure 17:
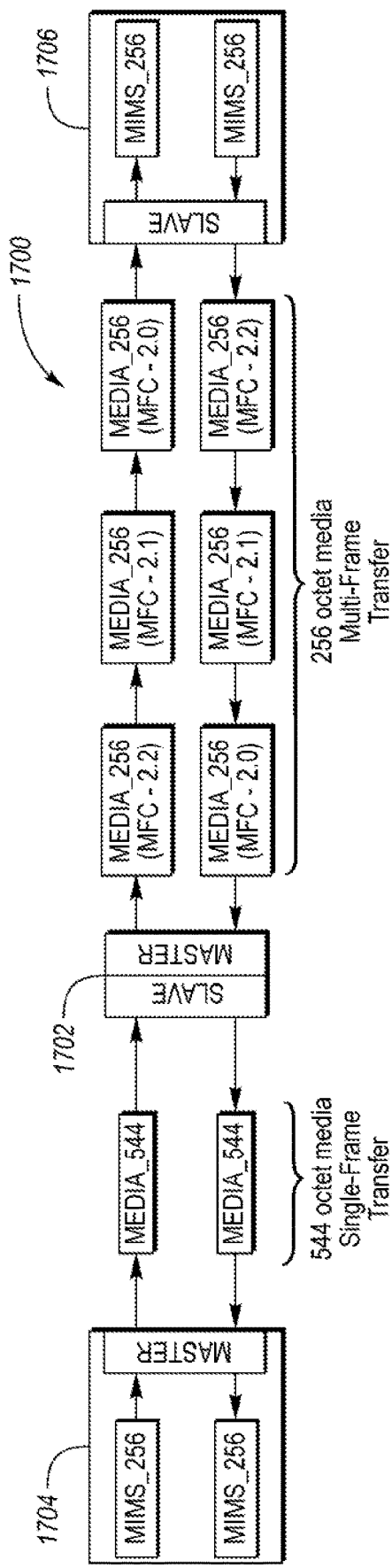
FIG. 17 depicts a communication transaction for a single-frame to multi-frame forwarding use case.

FIG. 17 shows a third use case 1700 that is a single-frame to multi-frame forwarding use case. The third use case 1700 assumes a MEDIA FRAME size of 544 octets for the communication channel between a sourcing MASTER 1704 and a routing MASTER 1702. The third use case 1700 assumes a MEDIA FRAME size of 256 octets for the communication channel between the routing MASTER 1702 and a SLAVE Node 1706. In this use case, the sourcing MASTER 1704 may send a PROTOCOL FRAME matched to the MEDIA FRAME as a single frame transfer (e.g., MEDIA_544). The routing MASTER 1702 may split the incoming frame into three MEDIA FRAMES for transmission to the SLAVE Node 1706. Each MEDIA FRAME may have a length of 256 octets. The SLAVE Node 1706 may respond using a multi-frame three-frame transfer (each of length 256 octets) to the routing MASTER 1702. The routing MASTER 1702 (or the forwarding device) may aggregate the multi-frame transfer into a single frame transfer (of length 544 octets) to the sourcing MASTER 1704 as a single-frame forwarding transfer.

The setup of the frame control fields for the sourcing MASTER may be as shown in Table 18.

TABLE 18

Sourcing MASTER frame control settings for example in FIG. 17

| Field | Value | Comments |
|---|---|---|
| PTYPE.SIZE | 3 | MIMS_544 |
| MFC.MFS | 0 | Setup for single frame transfer |
| MFC.MFI | 0 | Don't care |

The routing MASTER 1702 must split the 544-octet MEDIA FRAME into three 256-octet MEDIA FRAMES. The setup of the frame control fields for the routing MASTER 1702 may be as shown in Table 19.

TABLE 19

Routing MASTER frame control settings for example in FIG. 17

| Field | Value | Comments |
|---|---|---|
| PTYPE.SIZE | 3 | MIMS_544 |
| MFC.MFS | 2 | Transfer three (3) frames |
| MFC.MFI | 0, 1, 2 | Indices for frame[0 . . . 2] |

The SLAVE Node 1706 may receive three 256-octet MEDIA FRAMES and may re-assemble them into a single 544-octet PROTOCOL FRAME. The SLAVE Node 1706, after processing the 544-octet PROTOCOL FRAME, may respond with a 544 octet PROTOCOL FRAME. However; the SLAVE Node 1706 must split the 544-octet PROTOCOL FRAME into three 256-octet MEDIA FRAMES. The setup of the SLAVE Node 1706 response frame may be as shown in Table 20.

TABLE 20

SLAVE Node frame control settings for example in FIG. 17

| Field | Value | Comments |
|---|---|---|
| PTYPE.SIZE | 3 | MIMS_544 |
| MFC.MFS | 2 | Three (3) MEDIA FRAME transfer |
| MFC.MFI | 0, 1, 2 | Indices for frame[0 . . . 2] |

Figure 18:
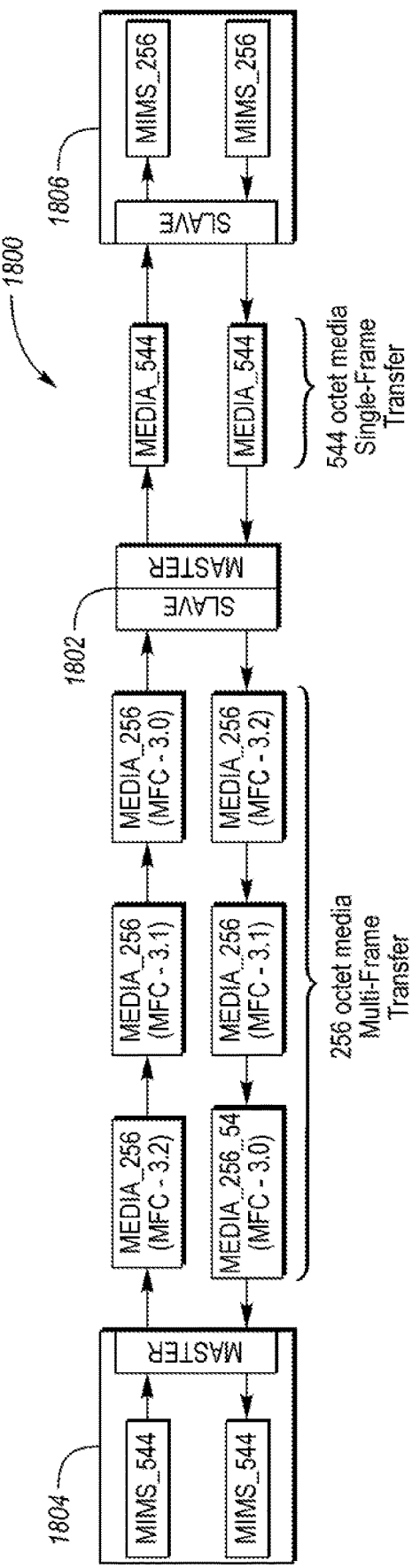
FIG. 18 depicts a communication transaction for a multi-frame to single-frame forwarding use case.

FIG. 18 shows a fourth use case 1800 in which a sourcing MASTER 1804 may launch a PROTOCOL FRAME with a length larger than the communication channel MEDIA FRAME length. The fourth use case 1800 assumes a MEDIA FRAME size of 256 octets for the communication channel between the sourcing MASTER 1804 and a routing MASTER 1802. The fourth use case 1800 assumes a MEDIA FRAME size of 544 octets for the communication channel between the routing MASTER 1802 and a SLAVE Node 1806. In this use case, the sourcing MASTER 1804 may send a PROTOCOL FRAME matched to the MEDIA FRAME as a three-frame 256-octet transfer (e.g., MEDIA_256). Each MEDIA FRAME may have a length of 256 octets. The routing MASTER 1802 may assemble the incoming frames into a single 544-octet PROTOCOL FRAME for transmission to the SLAVE Node 1806. The message may be sent to the SLAVE Node 1806 as a single 544-octet MEDIA FRAME. The SLAVE Node 1806 may respond with a single 544-octet MEDIA FRAME to the routing MASTER 1802. The routing MASTER 1802 (or the forwarding device) may split the single-frame 544-octet MEDIA FRAME into three 256-octet MEDIA FRAMEs for transfer to the sourcing MASTER 1804 as a multi-frame forwarding transfer. The sourcing MASTER 1804 may assemble the incoming frames into a single 544-octet PROTOCOL FRAME for further processing.

The SLAVE Node 1806 may consume the 544-octet frame and respond with a single 544-octet MEDIA FRAME transfer. The routing MASTER 1802 may split the incoming 544-octet MEDIA FRAME into three 256-octet MEDIA FRAME transfers to the sourcing MASTER 1804.

Table 21 shows the initial setup of the 256-octet MEDIA FRAMES sent by the sourcing MASTER 1804.

TABLE 21

Sourcing MASTER frame control setup
for example shown in FIG. 18

| Field | Value | Comments |
|---|---|---|
| PTYPE.SIZE | 3 | MIMS_544 |
| MFC.MFS | 2 | Transfer three (3) MEDIA FRAMES |
| MFC.MFI | 0, 1, 2 | Indices for frame[0 . . . 2] |

The routing MASTER 1802 may be configured to aggregate the three 256-octet MEDIA FRAMES to form a single 544-octet PROTOCOL FRAME. Table 22 shows the frame control setup for the routing MASTER 1802 and the SLAVE Node 1806 for aggregating the 544-octet MEDIA FRAME.

TABLE 22

Routing MASTER and SLAVE frame control
setup for example shown in FIG. 18

| Field | Value | Comments |
|---|---|---|
| PTYPE.SIZE | 3 | MIMS_544 |
| MFC.MFS | 0 | Single frame transfer |
| MFC.MFI | 0 | Don't care |

Block transfers may be supported for all protocol types. All block transfers may operate using PROTOCOL FRAMES. All block transfers may be moderated by the CSW and FTAG fields. See FIG. 12 and FIG. 14 for a view of the CSW and FTAG bit-fields respectively.

A zero BLK value may be used to indicate a single frame transfer. In this case, the FTAG field may be a PROTOCOL FRAME tag or sequence identifier. The FTAG field may be any 16-bit value to uniquely identify a frame.

A non-zero BLK value may be used to indicate a block transfer. In this case, the FTAG field may be defined as two bit-fields. The bit-fields are the Block ID (BID) field and the Frame Count (FC) field.

The Block Transfer Mode may support a transfer of up to sixteen frames. Table 13 defines the field for configuring the MASTER BLK bit-field block transfer request to setup a block transfer.

Given a specific frame size (PTYPE.SIZE), maximum frame transfers per block (CSW.BLK) and the 10-bit block ID (FTAG.BID), the maximum payload transfer size per block (block transfer size, BTS) and the maximum number of octets transferred per session (max session size, MSS) may be determined.

Table 23 shows the relationship between FRAME SIZE (FSIZE) and the block transfer session size.

TABLE 23

The relationship between FRAME SIZE, payload,
max block transfer and max block session size

| FSIZE | PSIZE | BTS | MSS |
|---|---|---|---|
| 128 | 96 | 1536 | 1.5M |
| 256 | 224 | 3584 | 3.5M |
| 544 | 512 | 8192 | 8.0M |
| 1056 | 1024 | 16384 | 16.0M | where FSIZE is the Frame Size (octets), PSIZE is the Payload Size (octets), BTS is the Block Transfer Size (octets), and MSS is the Maximum Session Size, (maximum # of octets transferred in one session).

Figures 19, 20:
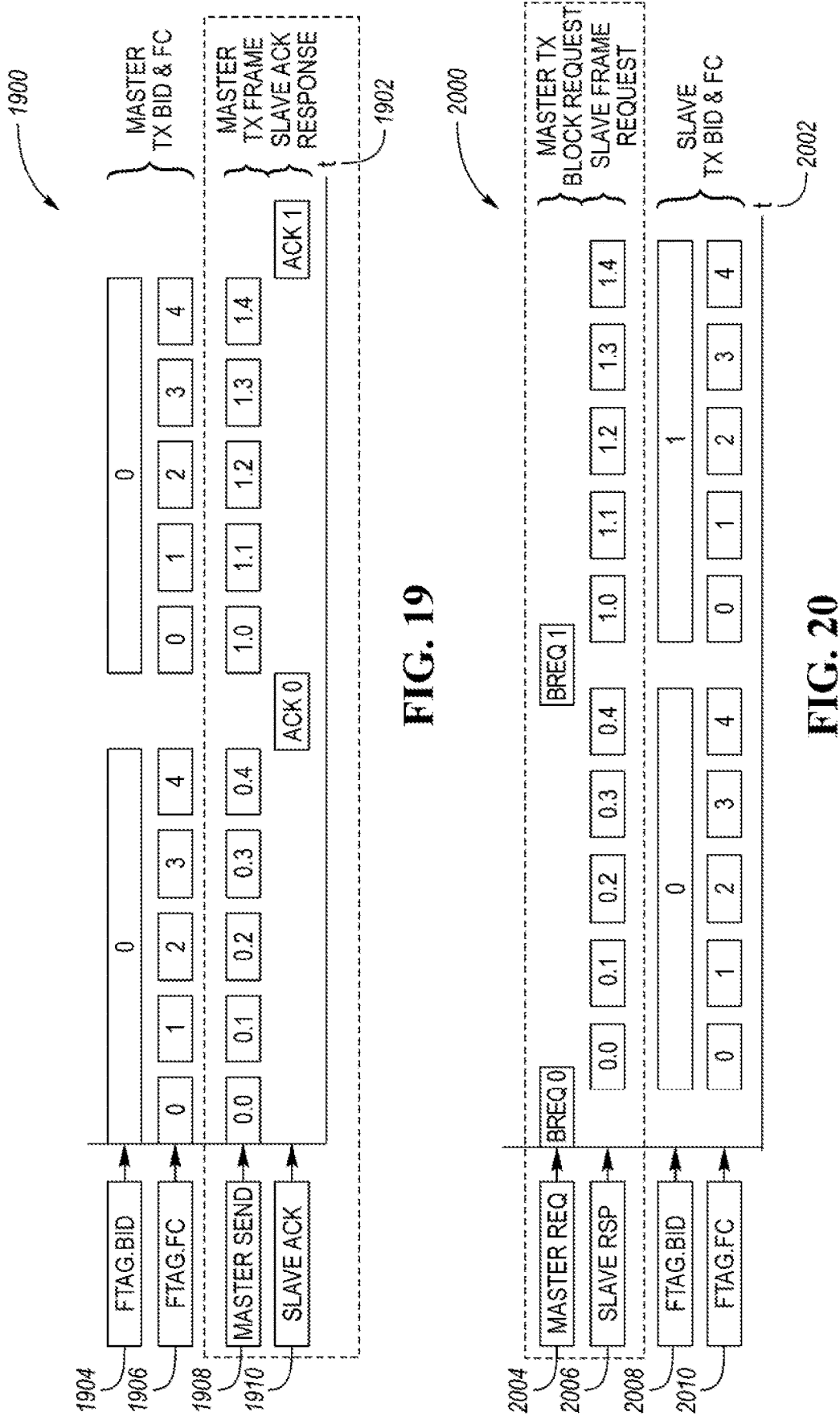
FIG. 19 depicts a block transfer from master to slave.
FIG. 20 depicts a block transfer from slave to master.

FIG. 19 and FIG. 20 depicts two use cases for a five PROTOCOL FRAME block transfer. The two use cases are known as SEND TO SLAVE (CSW.CTL=1) and RECEIVE FROM SLAVE (CSW.CTL=0). FIG. 19 depicts the SEND TO SLAVE use case 1900 and FIG. 20 depicts the RECEIVE FROM SLAVE use case 2000.

The process for a SEND block transfer may be initiated by the MASTER. For the duration of the block transfer, the MASTER sets the CSW.BLK bit-field to a non-zero value. The MASTER may follow certain rules for a SEND TO SLAVE block transfer. The MASTER sets the CSW.CTL=1 to indicate a SEND TO SLAVE block transfer. The MASTER sends CSW.BLK+1 PROTOCOL FRAMES to the SLAVE. The Frame TAG block ID (FTAG.BID) is set to a unique 10-bit number. The Frame TAG Frame Count, (FTAG.FC) is set to zero at the start of the block transfer. The FTAG.FC is incremented for each PROTOCOL FRAME during the transfer.

The SLAVE will acknowledge using a single PROTOCOL FRAME for each SEND TO SLAVE block transfer. The SLAVE may follow certain rules for a SEND TO SLAVE block transfer. The SLAVE sends an ACK frame after receiving the last FTAG.FC within the block. The SLAVE echoes the block ID (FTAG.BID) during the acknowledge. The SLAVE FTAG.FC response is don't care. The SLAVE block transfers ACK payload is dependent on the protocol type.

FIG. 19 depicts a SEND TO SLAVE use case 1900. A time axis 1902 may be defined that shows the progression of time during the SEND TO SLAVE transfer. Depicted is the message transfer over time. A BID row 1904 depicts the value of the FTAG.BID for certain time intervals. A FC row 1906 depicts the value of the FTAG.FC for certain time intervals. A Master Send Row 1908 represents certain time intervals during which the MASTER is transferring a frame. A SLAVE ACK row 1910 represents time intervals during which the SLAVE sends an acknowledgment. In the example, the MASTER is transferring five frames. The MASTER may send message frames denoted as 0.0, 0.1, 0.2, 0.3, and 0.4. The Frame Count corresponding to each of the message frames is shown as 0, 1, 2, 3, and 4. After five frames are sent by the MASTER, the SLAVE responds with an ACK message (denoted as ACK 0). In the example, the MASTER initiates another five-frame transfer with message frames denoted 1.0, 1.1, 1.2, 1.3, and 1.4 with corresponding Frame Count of 0, 1, 2, 3, and 4. The second five-frame transfer is followed by the SLAVE responding with an ACK message (denoted ACK 1).

The MASTER device may determine a course of action for failed send block transfers. There are several scenarios in which an ERROR conditions may arise. An error may be present when the last frame is not received by SLAVE. When the last frame is not received by the SLAVE, the SLAVE may be configured to prevent sending an acknowledgement (ACK). In this case, the MASTER may timeout and take appropriate action.

An error may be present when the last frame is received by SLAVE, but not all frames are received. An error may be present if all frames were received but failed an individual frame CRC32 check. For these conditions, the SLAVE may be configured to send a block transfer NAK indication. The SLAVE block transfer NAK may be signaled by setting the CSW.CERR bit and signaling the CSW.SSTAT field as shown in Table 24.

TABLE 24

SEND-TO-SLAVE block transfer status, CSW.SSTAT field definitions

| CSW.SSTAT | Response | CSW.CERR | Description |
|---|---|---|---|
| 0 | ACK | 0 | Block transfer success |
| 1 | NAK | 1 | Last frame received, yet incomplete block received |
| — | NONE | — | Last frame not received |

A corrupted (bad CRC32) SLAVE ACK frame indicates a failed block transfer. It is recommended the MASTER resend the block on detection of this condition.

The SLAVE ACK block ID FTAG.BID response should match the block ID sent by the MASTER. The SLAVE ACK block frame count FTAG.FC response is set to the block transfer size as sent by the MASTER via the CSW.BLK field.

The SLAVE block transfer ACK payload is dependent on the protocol type and block transfer status. The MASTER must ensure the SLAVE block transfer ACK response will fit in the payload of a SEND-TO-SLAVE ACK response.

FIG. 20 depicts a RECEIVE FROM SLAVE use case 2000. A time axis 2002 may be defined that shows the progression of time during the RECEIVE FROM SLAVE transfer. Depicted is the message transfer over time. The process for the receive block transfer may be initiated by the MASTER. For the duration of the transfer; the MASTER may set the CSW.BLK bit-field to a non-zero value. The MASTER may follow certain rules for a RECEIVE FROM SLAVE block transfer. The MASTER clears the CSW.CTL bit to zero to indicate a RECEIVE block transfer. The MASTER requests CSW.BLK+1 PROTOCOL FRAMES from the SLAVE. The Frame TAG block ID (FTAG.BID) is set to a unique 10-bit number. The MASTER payload is dependent on the PROTOCOL TYPE and request.

A FC row 2010 depicts the value of the FTAG.FC for certain time intervals. A Master Req Row 2004 represents certain time intervals during which the MASTER is requesting a block transfer. A SLAVE RSP row 2006 represents time intervals during which the SLAVE sends message frames. In the example, the MASTER is requesting five frames. The MASTER may send a block request (BREQ 0). The SLAVE may respond by sending message frames denoted as 0.0, 0.1, 0.2, 0.3, and 0.4. The Frame Count corresponding to each of the message frames is shown as 0, 1, 2, 3, and 4. After five frames are sent by the SLAVE, the MASTER may respond with another block transfer request (BREQ 1). In the example, the SLAVE responds with another five-frame transfer with message frames denoted 1.0, 1.1, 1.2, 1.3, and 1.4 with corresponding Frame Count of 0, 1, 2, 3, and 4.

After receiving the receive block transfer request, the SLAVE may respond with the requested number of PROTOCOL FRAMES. The SLAVE may follow certain rules for a RECEIVE FROM SLAVE block transfer. The SLAVE responds with (CSW.BLK+1) PROTOCOL FRAMES. The SLAVE sets the CSW.BLK to the value requested by the MASTER. The SLAVE sets the FTAG.BID response to that requested by the MASTER. The first SLAVE transmitted frame sets the FTAG.FC to zero. Subsequent transmitted PROTOCOL FRAMES may increment the FTAG.FC. The SLAVE payload is dependent on the PROTOCOL TYPE and MASTER request.

Any SLAVE can signal an error condition via an ERROR FRAME. Error conditions may occur during any CONTROL or DATA plane transaction. A SLAVE may also signal an unsolicited error condition. The unsolicited error condition is known as an EVENT error condition.

The Control and Status Word (CSW) has both a Control Plane and Data Plane error signaling bit. Each of these bits, in conjunction with the CTL bit indicates up to four SLAVE error responses. Table 25 shows each of the Control and Data Plane error signaling conditions.

TABLE 25

Error signalling conditions

| CERR | DERR | CTL | Error condition |
|---|---|---|---|
| 0 | 0 | X | Normal Frame transport, NO error |
| 1 | 0 | 0 | Control Plane get-request error |
| 1 | 0 | 1 | Control Plane set-response error |
| 0 | 1 | 0 | Data Plane get-request error |
| 0 | 1 | 1 | Data Plane set-response error |
| 1 | 1 | X | reserved | where CERR is the Control Plane Error bit field, DERR is the Data Plane Error bit field, CTL is the GET/SET transfer bit field, and X indicates that the value does not matter.

Figure 21:
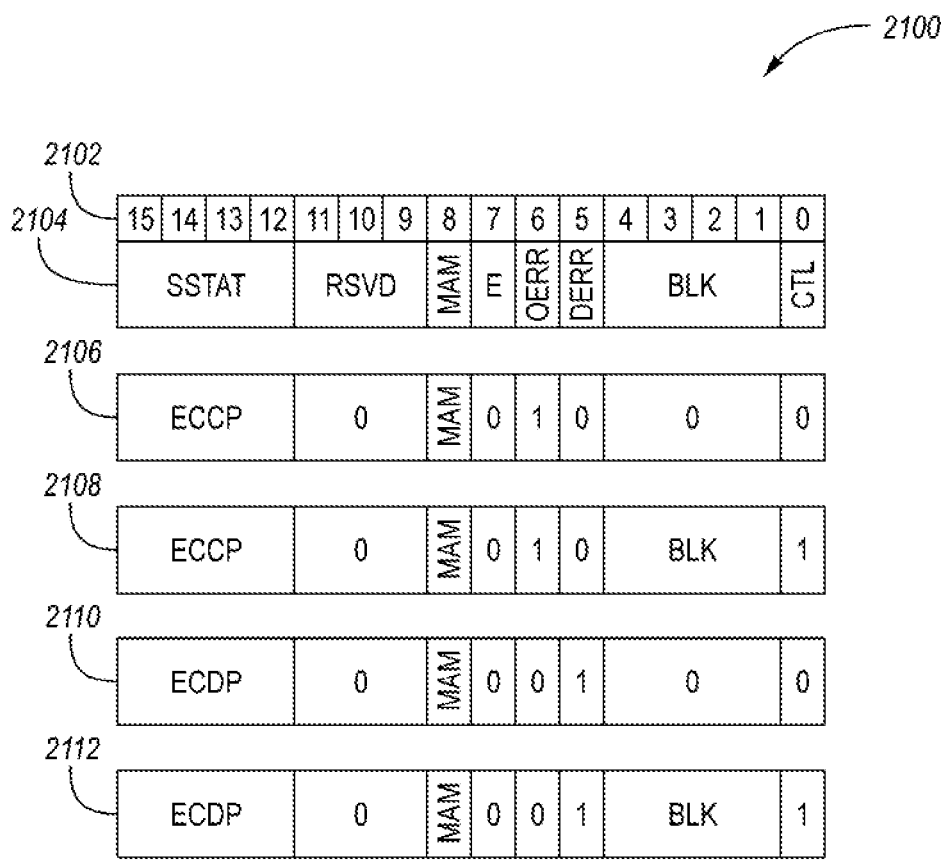
FIG. 21 depicts possible status field values for error notification.

The error signaling layout for the CSW is also shown in FIG. 21. FIG. 21 shows the recommended values for each of the bit fields. Also shown are the SSTAT fields as an orthogonal set of Control Plane Error (CERR) and a Data Plane Error (DERR) status codes. A first bit-field definition 2104 may generally define the positions of bits. An SSTAT field may be a SLAVE status field and may take on values indicative of a control plane error code (ECCP) and a data plane error code (ECDP). The E field may be an event notification. The CERR field may indicate that a control transfer was successful or an error occurred. The DERR field may indicate that a data transfer was successful or an error occurred. The CTL field may indicate a GET or SET response. The BLK field may be echoed for a set response and zero for a get response.

A second bit-field 2106 may be an example of a control plane get-request error. A third bit-field 2018 may be an example of a control plane set-request error. A fourth bit-field 2110 may be an example of a data plane get-request error. A fifth bit field 2112 may be an example of a data plane set-request error.

Figure 22:
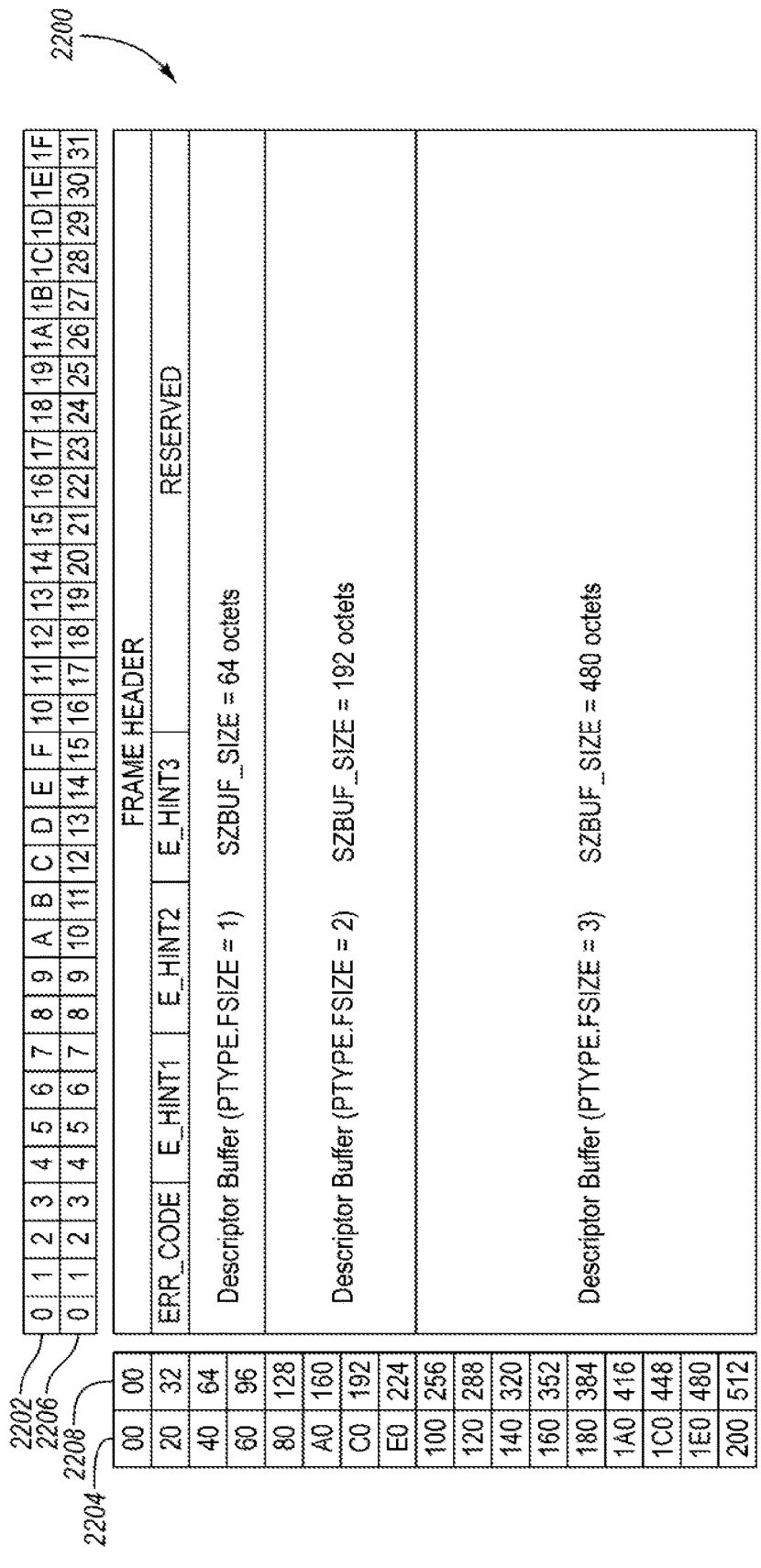
FIG. 22 depicts a possible structure for an error frame.

Upon signaling an error, the payload may contain an error frame. The format of the error frame 2200 may be as shown in FIG. 22. Individual octets within the frames may be indexed by a hexadecimal octet position index 2202 and/or a decimal octet position index 2204. Octets within the error frame may also be indexed by a hexadecimal address 2206 and/or a decimal address 2208. For example, the position within the error frame of any byte of information may be determined by using the hexadecimal octet position index 2202 and the hexadecimal address 2206. The error message frame may include four 32-bit messaging fields and a 16-octet reserved field with the rest of the payload designated as a string-oriented descriptor buffer. The first messaging field (ERR_CODE) may be an application-specific error code. The second (E_HINT1), third (E_HINT2), and fourth (E_HINT3) fields may be developer-assigned hints. The string-oriented descriptor buffer may hold a NUL terminated character string. This string may carry any extra information for diagnostics capability.

There may be a total of 2048 possible common protocols available for MIMS. The protocols may be reserved in the range 0 to 0x07FF. All common protocols may use a 6-octet MIMS Addressing (MA) with routing rules. Any new common protocols may be added later. All devices may advertise the protocols known via a CAPABILITIES request.

A list of known common protocols may be defined as shown in Table 26. Each protocol and behavior is described in later sections of this document.

TABLE 26

Common PROTOCOLS for the MIMS compliant nodes

| VALUE | PROTOCOL | Addressing | Description |
| --- | --- | --- | --- |
| 0x0000 | CAPABILITY | MA | GET ALL protocol capabilities |
| 0x0001 | PROPERTY | MA | GET/SET property-value pair |

Figure 23:
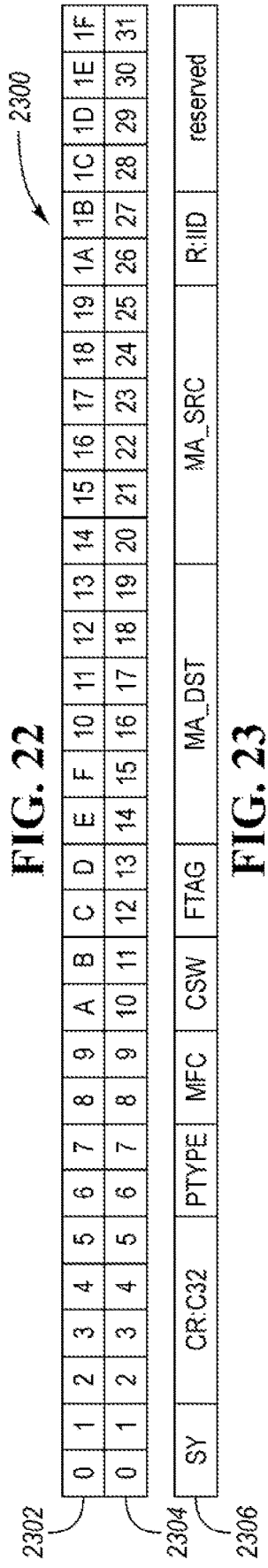
FIG. 23 depicts a possible message frame header.

A top-level MASTER may communicate to any Node within its routing tree using any COMMON protocol with MIMS Addressing. FIG. 23 shows a map 2300 of a 32-octet MIMS frame header 2306. Individual octets within the MIMS frame header 2306 may be indexed by a hexadecimal octet position index 2302 and/or a decimal octet position index 2304. Table 27 introduces the MIMS Address (MA) and routing instance ID (RIID) fields. The remaining fields may function as previously described herein.

TABLE 27

A summary of the MAC addressing with routing information

| Field | Offset | Width | Description |
| --- | --- | --- | --- |
| MA_DST | 14 | 6 | MIMS Address, destination |
| MA_SRC | 20 | 6 | MIMS Address, source |
| RIID | 26 | 2 | Routing Instance Identifier |

Within its local domain, each Node may bind an access method to a MIMS address. When a request is made to a specific routing MASTER, the master may look up and execute the proper access method to send and receive frames to the Node.

Figure 24:
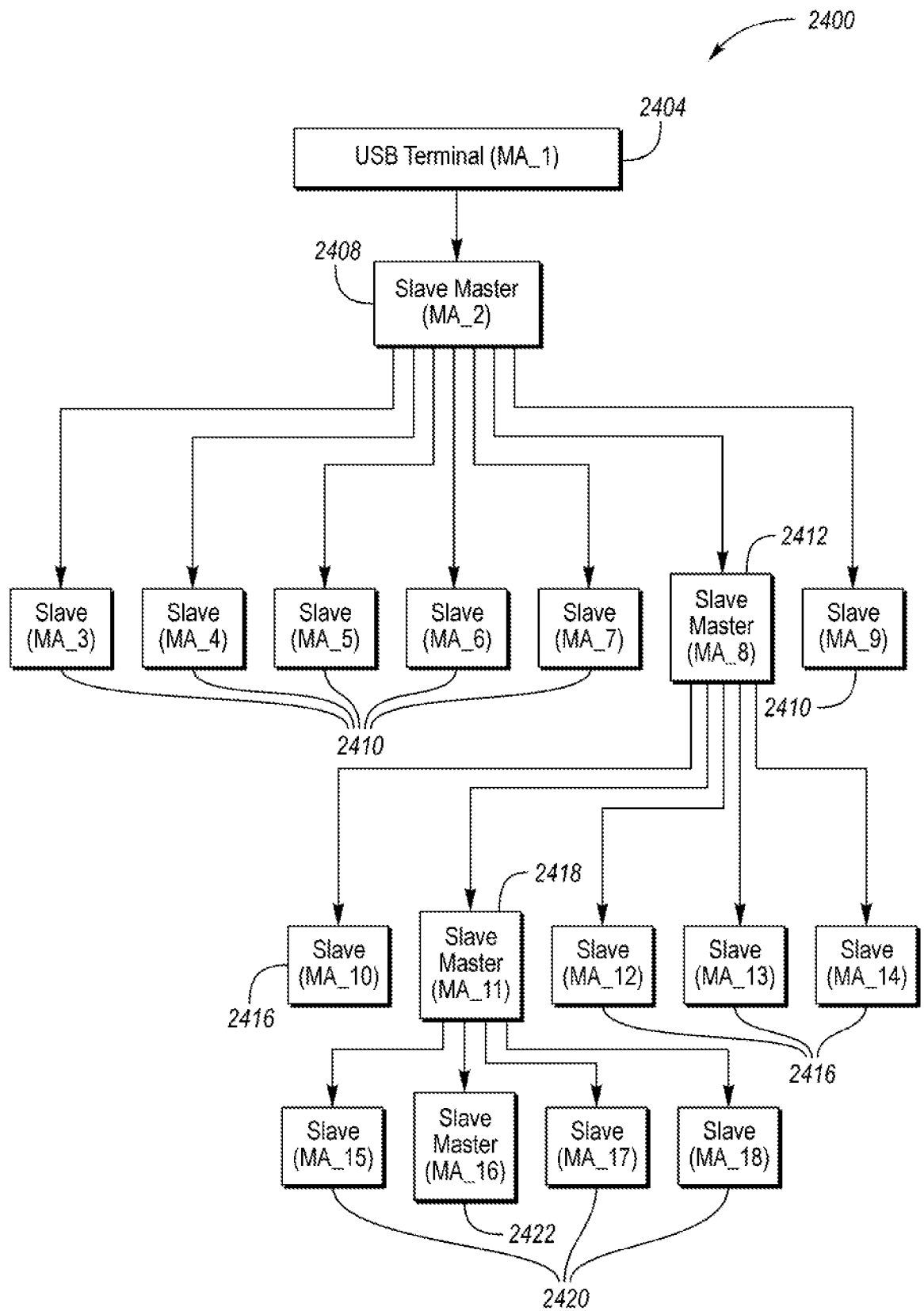
FIG. 24 depicts a possible configuration of a communication network having master and slave devices.

FIG. 24 shows a generic view of a typical MASTER-SLAVE network 2400. In this example, each of the MASTERS communicates to a SLAVE using a specific physical and link layer technology. One of the concepts introduced by the MIMS session layer is to allow bridging or routing between the various Local Domains (LD). This bridging between the Local Domains is affected via the MIMS addressing along with the Routing Instance Identifier (RIID) tag.

The M/S network 2400 may include a first Slave Master 2408 (MA_2). The first Slave Master 2408 may be configured to learn and store all routes of communication for connected slave nodes or master/slave nodes. The first Slave Master 2408 may be in communication with a first group of Slave Nodes 2410 (MA_3, MA_4, MA_5, MA_6, MA_7, and MA_9). The first Slave Master 2408 may be in communication with a second Slave Master 2412 (MA_8).

The M/S network example 2400 may include a USB Terminal 2404 that may be configured as a Master node. The USB Terminal 2404 may be configured to learn and store all routes of communication for connected devices. In this example, the USB terminal 2404 is connected to the first Slave Master 2408.

The second Slave Master 2412 may be in communication with a second group of Slave Nodes 2416 (MA_10, MA_12, MA_13, MA_14) and a third Slave Master 2418 (MA_11).

The third Slave Master 2418 may be in communication with a third group of Slave Nodes 2420 (MA_15, MA_17, MA_18) and a fourth Slave Master 2422 (MA_16).

The third Slave Master 2418 may be configured to learn and store communication routes for all connected Slave Nodes 2420. The third Slave Master 2418 may be configured to learn and store communication routes for any Slave Masters to which it communicates as a Master. In this example, the third Slave Master 2418 may be configured to learn and store communication routes associated with the fourth Slave Master 2422.

The second Slave Master 2412 may be configured to learn and store communication routes for all connected Slave Nodes 2416 and Slave Masters (e.g., 2418) that operate in Slave Mode with respect to the second Slave Master 2412.

The first Slave Master 2408 may be configured to learn and store communication routes for all connected Slave Nodes 2410 and Slave Masters (e.g., 2412) that operate in Slave Mode with respect to the first Slave Master 2408.

The Slave/Master Nodes may have certain features that enable routing. All Slave/Master Nodes are capable of routing. All Slave/Master Nodes may have any number of MASTER or SLAVE devices connected to it. All S Slave/Master Nodes may learn the routes for its LD and all subsequent LDs. Each Slave/Master Node shall have a physical-dependent access method attached to a specific route.

Figure 25:
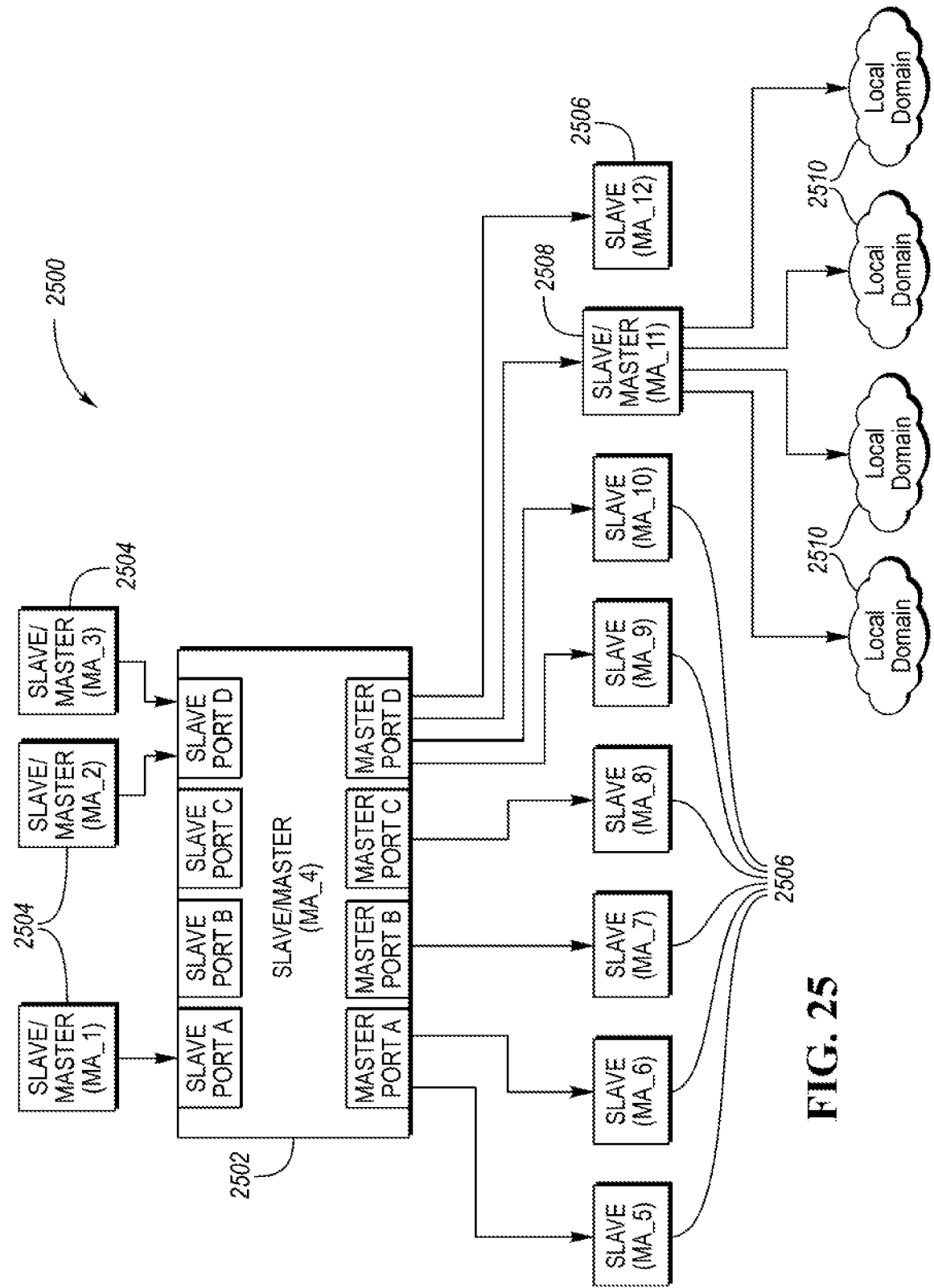
FIG. 25 depicts a slave-master node and possible communication connections.

FIG. 25 shows the MIMS (S/M) addressing features 2500 using a Slave Master 2502 that is configured as a 4-port MASTER and a 4-port SLAVE node as an example. The figure depicts how the routing of any MASTER request may be accommodated by the (S/M) node. The system may follow certain rules for MASTER to SLAVE MAC address forwarding. Any frame originated by a node may be assigned a RIID value of zero. Any routed frame may have a non-zero RIID value. An incoming frame is routed in response to the MIMS destination address not being equal to the (S/M) address and the MIMS destination address being equal to the learned routing MIMS address. The (S/M) node may lookup an existing RIID tag using (e.g., a reverse lookup) the SOURCE MIMS address, the SOURCE port ID, and/or the SOURCE RIID tag. If the RIID entry does not exist, the node generates a new and unique RIID tag (e.g., new RIID table entry) and binds this value to the SOURCE MIMS address, the SOURCE port ID, and the SOURCE RIID tag. The (S/M) node may substitute the RIID tag and forward the frame to the proper SLAVE port.

Likewise, there may be a set of rules for any received frame. In this case, the RIID establishes the routing or frame handling rules. The SLAVE to SOURCE MIMS address reception may follow certain rules. Any received frame with the RIID tag of zero is consumed by the node. Any received frame with a non-zero RIID tag is forwarded to the SOURCE port using the RIID tag. The (S/M) device may look up the RIID entry using the incoming RIID tag SOURCE MIMS address, SOURCE port ID, and SOURCE RIID tag. The (S/M) node may substitute the stored RIID tag and forward the packet to the stored SOURCE port ID.

A first set of Slave Master Nodes 2504 may be in communication with the Slave Master 2502 via one or more Slave ports. The Slave Master 2502 may bind a unique RIID to forwarded MIMS addressed frames using the SOURCE address and the SLAVE port ID. The Slave Master 2502 may be in communication with a first group of Slave Nodes 2506 via one or more Master ports. The Slave Master 2502 may be in communication with a second Slave Master 2508 via one of the Master ports.

The Slave Master 2502 may learn all routes under its local domain (e.g., Slave Nodes 2506) and subsequent local domains of connected Slave/Master Nodes (e.g., 2508). The Slave Master 2508 may be connected to various local domain devices 2510.

The rules for forwarding and receiving any RIID stamped frame may use an RIID routing table. The purpose of this table is to establish the upstream routes for any downstream routed frame. In the event of any SLAVE or MASTER device losing connection, the RIID table requires each entry to be time-stamped and aged out. The aging time for the RIID table is dependent on the Local Domain and all connections to a specific (S/M) device. Therefore, it is optional, yet desirable to allow the aging time parameter for a specific (S/M) device to be configured at run-time.

Each device may be addressed by a 6-octet MIMS address. The address may be either a statically assigned MIMS address or a dynamically assigned MIMS address.

All MIMS nodes may support the CAPABILITY protocol type. The CAPABILITY protocol type allows any MASTER to determine the list of common and application protocols that are supported by a particular node. The MASTER may set the PTYPE.PROTOCOL field to zero and the payload to all zero values to issue a CAPABILITY request. Only GET requests may be honored by the CAPABILITY request. The MASTER may set the CSW.CMD bit-field to zero (GET) in order to issue a CAPABILITY request.

The SLAVE may process and respond to the CAPABILITY request. The SLAVE may indicate any associated capabilities. The CAPABILITY request may include a field for the Universally Unique Identifier (UUID) and other descriptor fields as shown in Table 28. The CAPABILITY response fields may always be reported in network byte order.

TABLE 28

Format of the CAPABILITY request message

| Offset | Size | Name | Description |
| --- | --- | --- | --- |
| 0 | 4 | Reserved | Reserved, set to zero (0) |
| 4 | 16 | UUID | Universally Unique Identifier |

TABLE 28-continued

Format of the CAPABILITY request message

| Offset | Size | Name | Description |
| --- | --- | --- | --- |
| 20 | 4 | DDW | Device Descriptor Word |
| 24 | 2 | MFS | Media Frame Size |
| 26 | 2 | MBS | Maximum Block Transfer Size |
| 28 | 2 | PLSIZE | Protocol List Size |
| 30 | PLSIZE × 2 | PLIST | Protocol type List (list of protocol types) |

In Table 28, all sizes may be in octets. The Offset column represents an offset in octets from the start of the PAYLOAD section. UUID is the Universally Unique Identifier that is a unique 128-bit word which identifies the node. MBS is a Maximum Block Transfer size that defines the maximum payload octets allowed in block transfer. DDW is the Device Descriptor Word that may be used to notify the MASTER of any extra information. PLSIZE is a total number of protocol types supported by this device. PLIST is an array of protocol types supported by this device.

The UUID is the Universally Unique Identifier. This is a 128-bit word that can guarantee a unique identification for the node. Some of the purposes for using the UUID are to guarantee a unique 128-bit application identity and to allow the Host Services Gateway to acquire the correct Application Descriptor Sheet (schema).

Figure 26:
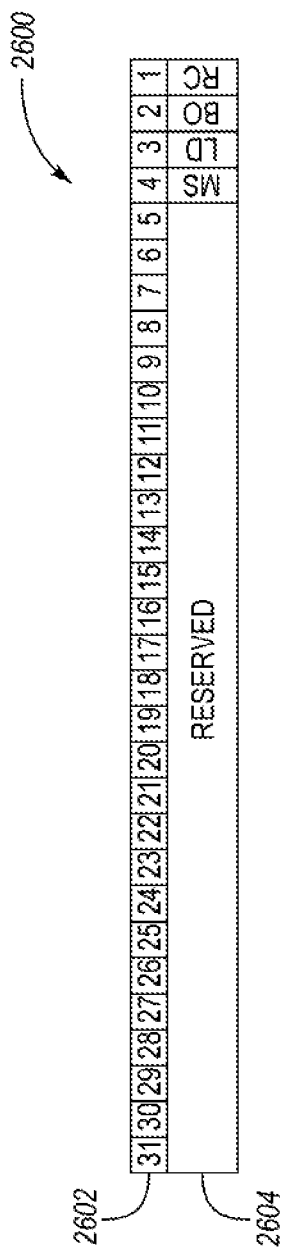
FIG. 26 depicts a possible structure for a device descriptor work message field.

The Device Descriptor Word contains bit-fields which may yield more information about a specific device. FIG. 26 shows the format 2600 of the DDW 2604. Individual bits within the word may be indexed by a decimal bit position index 2602.

A Master bit-field (MS) indicates whether the node is SLAVE/MASTER (SM) capable, or a SLAVE only. A one in this bit-field indicates that the device is SM. A zero indicates that this device is SLAVE only.

A Routing capable bit-field (RC) indicates whether this node has any MIMS routing capability. Even though all SM devices may always have routing capability, some SLAVE only devices may have some MIMS routing capability.

A payload byte-ordering bit-field (BO) specifies the byte ordering capability of the node for the payload. The byte ordering of the MIMS header may always be network byte order (BIG ENDIAN). The payload byte ordering is device dependent. A one in this bit-field indicates that the node uses BIG ENDIAN byte ordering. A zero indicates that the node uses LITTLE ENDIAN byte ordering for the payload.

A loader/application mode bit field (LD) defines a mode of the node. Any node can be in loader or application mode. The loader mode functions are used to support field upgrades of the firmware. A one in this bit-field indicates the node is in LOADER mode. A zero in this bit-field indicates the node is in APPLICATION mode.

Referring again to Table 28, a media frame size bit-field (MFS) specifies the number of octets required to support MEDIA FRAME transfers for the particular node and physical interface. All local transports may be performed via MEDIA FRAME transfers using a fixed MFS size.

A maximum block transfer size bit-field (MBS) specifies the maximum block transfer size of the node. Some MIMS capable nodes may have memory resource constraints and may have some limited capability to transfer blocks of information. The Maximum Block Transfer MBS field is used to describe this limitation to a MASTER. The MBS field contains the maximum number of octets allowed in the total payload for any block transfer.

A protocol list size (PLSIZE) bit-field indicates the total number of PROTOCOLS that the device can interpret on its Local Domain. This number may include CAPABILITY protocol type as part of the protocol list.

A protocol type list (PLIST) bit-field may be a list of all the protocols that the node can support. The size of the list is PLSIZE elements or PLSIZE×2 octets long.

The MIMS addressable PROPERTY protocol type allows a MASTER to get or set a list of values that are associated with a list of PAMS properties. Properties are hash-tags which are defined in a dictionary. For MIMS, the properties may be defined as a set of hash-tags in a PAMS ADS file associated with the particular node.

The property dictionary defines the association of a property hash-tag with a set of types. In this way, any MASTER, with the ADS dictionary can retrieve or set information on a particular node.

Figure 27:
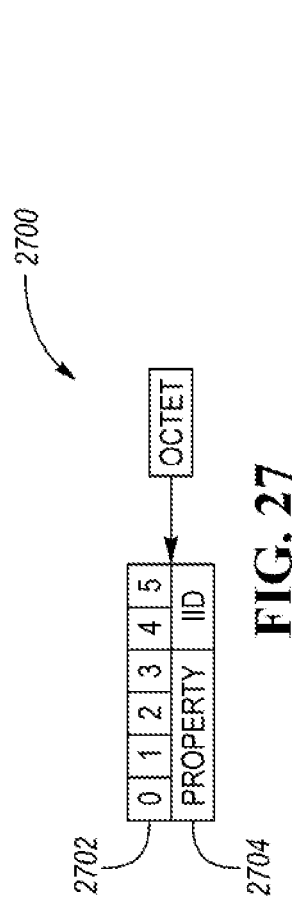
FIG. 27 depicts a possible structure for a property hash record.

To request or set a particular property, the node may construct a property hash record (PHR). The record may consist of two fields. These fields may be the Property tag (PROPERTY) and the Instance Identifier (IID). FIG. 27 shows the format 2700 of the Property Hash Record 2704 as indexed by an octet position index 2702.

Figure 28:
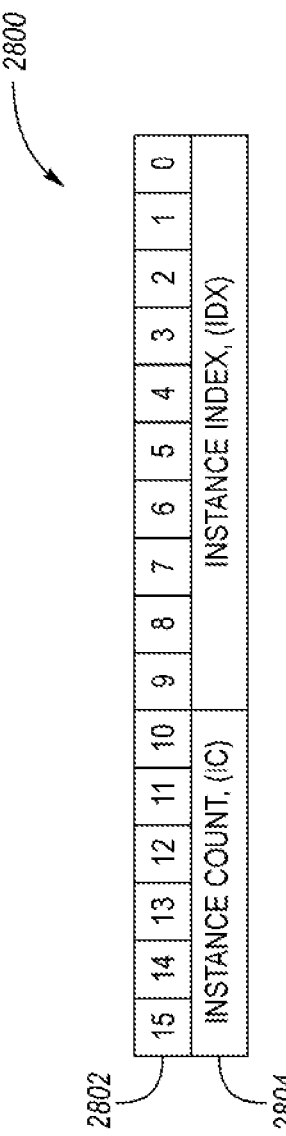
FIG. 28 depicts a possible structure for an instance identifier bit-field.

A property tag bit-field (PROPERTY) may be a 32-bit value that is defined in the ADS dictionary. This dictionary may be stored in a repository and be retrieved using the node UUID. An instance identifier bit-field (IID) may define a value that is used to access arrays, parts of arrays or scalars. FIG. 28 depicts a possible format 2800 for the IID field 2804 as indexed by a bit-position index 2802. A brief description of the IID bit-fields is shown in Table 29.

TABLE 29

Bit-field definitions of the IID field

| Mnemonic | Name | # bits | Description |
|---|---|---|---|
| IDX | Instance Index | 10 | Instance Index, Starting index for a property value array |
| IC | Instance Count | 6 | Total number of values to retrieve |

The instance index (IDX) bit-field may be a zero-referred starting index in a property value array. The IDX value may be set to zero, if the property value is a scalar. Otherwise, the IDX value is set to the starting index into the array.

The instance count (IC) bit-field sets up the total number of values to set or get. The IC value may be set to one if the property represents a scalar. A zero value for the IC value may have special significance. An instance identifier of 0.0 may be configured to return the current number of available elements represented by the property.

VECTOR LISTS (arrays) may be represented internally as a list of instances. There may be two element count parameters. The parameters may be referred to as the MAX_COUNT (or m_count) parameter and the VECTOR_COUNT (or v_count) parameter.

The m_count parameter may contain the MAXIMUM number of elements that are possible in the list. This parameter may be fixed and may be exposed as part of the PAMS mark-up. The v_count parameter may contain the total number of valid elements currently in the list. This parameter may have any value from zero to (m_count−1) at run-time.

The internal vector list may always start with an index of zero. Any element can be accessed by setting up the property hash record, PHR, instance identifier, (IID) value.

Scalars may always be represented as a single instance. The number of elements available (MAX or VALID) may always be equal to one. Any SCALAR request with an instance count, (IC) greater than one may cause the SLAVE to return an ERROR FRAME.

To retrieve a set of property values, the MASTER or CLIENT may request a list of property values. To do this, the MASTER may clear the CSW.CTL bit to zero and send the total property count and a list of property hash records, PHR list. The payload format for this request is shown in Table 30.

TABLE 30

Format for a GET PROPERTY request.

| Offset | Size | Name | Description |
|---|---|---|---|
| 0 | 2 | N | Total number of property values to retrieve |
| 2 | 6 | $PHR_0$ | Property Hash Record [0] |
| 8 | 6 | $PHR_1$ | Property Hash Record [1] |
| ... | ... | ... | More Property records |
| 6 × (N − 1) | 6 | $PHR_{(N-1)}$ | Last Property Record |

The targeted SLAVE may respond with a GET Response. In this case, the CSW.CTL bit is still cleared (get-response) and the SLAVE sends a list of PHR values followed by the list of values. The format for the response is shown in Table 31.

TABLE 31

Format for a GET PROPERTY response

| Offset | Size | Name | Description |
|---|---|---|---|
| 0 | 2 | N | Total number of properties |
| 2 | 6 | $PHR_0$ | Property Hash Record [0] |
| 8 | 6 | $PHR_1$ | Property Hash Record [1] |
| ... | ... | ... | More property hash records |
| 6 × (N − 1) | 6 | $PHR_{(N-1)}$ | Last Property Hash Record |
| 6 × N | sizeof($VALUE_0$) | $VALUE_0$ | VALUE 0 |
| (6 × N) + sizeof(VALUE) | sizeof($VALUE_1$) | $VALUE_1$ | VALUE 1 |
| ... | sizeof(VALUE) | VALUE | More values |
| (6 × N) + Σ{sizeof($VALUE_i$)} | sizeof($VALUE_{N-1}$) | $VALUE_{(N-1)}$ | Last value |

Within each property response; the CLIENT may interrogate a list of instances for any VECTOR LIST property type. The format of the VECTOR LIST get-response sub-field is shown in Table 32. In this example, the sizes are all uniform because each of the instances is identical in size.

TABLE 32

GET-RESPONSE vector list sub-field get-response format

| Offset | Size | Name | Description |
|---|---|---|---|
| 0 | 2 | rc | return count of valid instances |
| 2 | sizeof(VALUE) | $VALUE_{idx}$ | VALUE @ idx |
| ... | ... | VALUE | More VALUES |
| 2 + (ic − 1) × sizeof(VALUE) | sizeof(VALUE) | $VALUE_{ic-1}$ | VALUE @ (ic − 1) |

The SLAVE device may return the number of VECTOR LIST properties requested by the IID instance (ic) count. This number may be referred to as the return count (rc) value. Any element instances between the v_count and the m_count range are represented by a NUL-filled instance, (e.g., an instance filled with zeros).

The return count value, (rc) may be dependent on the requested index (idx), instance count (ic) and vector count (v_count) values. The sum of the (ic) and the (idx) parameters may be referred to as the return length index (RLI). The RLI definition may be as follows.

IF RLI≡idx+ic       (2)

The RETURN COUNT (rc) value may be dependent on the return length index (RLI). The calculation may use the following set of inequalities:

IF {RLI<m_count} THEN TX ERROR FRAME       (3)

ELSEIF {RLI>v_count} THEN rc=v_count−idx       (4)

ELSE rc=ic       (5)

A set of value(s) or the number of elements may be queried via a get-request IID. A non-zero instance count may get a SCALAR or a VECTOR LIST. A zero-instance count may get the number of valid elements (v_count) for the property. Table 33 shows the GET-REQUEST rules for SCALAR properties.

TABLE 33

GET-REQUEST SCALAR instance identifier rules

| IID.idx | IID.ic | RETURN | size/comments |
|---|---|---|---|
| 0 | 0 | 1 | (unsigned short), the number one (1) |
| 0 | 1 | SCALAR | (size depends on type), scalar value |
| >0 | 0 | ERROR | An ERROR FRAME |
| X | >1 | ERROR | An ERROR FRAME |

Table 34 shows the GET-REQUEST rules for VECTOR LIST properties.

TABLE 34

GET-REQUEST VECTOR LIST instance identifier rules

| IID.idx | IID.ic | RETURN | size/comments |
|---|---|---|---|
| X | 0 | v_count | (unsigned short), VECTOR LIST count |
| idx | ic | VECTOR LIST | [rc + list of values]; rc is (unsigned short), INSTANCE size depends on type. |

To modify or set a list of property values, the MASTER can send a SET Request. To do this, the master sets the CSW.CTL bit to a one (set request) and sends a list of PHR: VALUE pairs. This operation works on properties that are defined with the writable attribute. Otherwise, the SLAVE responds with an ERROR FRAME. The payload format for the SET Request is shown in Table 35.

TABLE 35

Format for a SET property request

| Offset | Size | Name | Description |
|---|---|---|---|
| 0 | 2 | N | Total number of properties |
| 2 | 6 | $PHR_0$ | Property Hash Record [0] |
| 8 | 6 | $PHR_1$ | Property Hash Record [1] |
| ... | ... | ... | More Property Hash Records |
| 6 × (N − 1) | 6 | $PHR_{(N-1)}$ | Last Property Hash Record |
| 6 × N | $sizeof(VALUE_0)$ | $VALUE_0$ | VALUE 0 |
| (6 × N) + sizeof(VALUE) | $sizeof(VALUE_1)$ | $VALUE_1$ | VALUE 1 |
| ... | sizeof(VALUE) | VALUE | More values |
| (6 × N) + $\Sigma\{sizeof(VALUE_i)\}$ | $sizeof(VALUE_{N-1})$ | $VALUE_{(N-1)}$ | Last value |

To confirm the successful SET operation, the SLAVE may send a list of PHR values back to the requesting MASTER to confirm that the SET operation succeeded. The SLAVE may set the CSW.CTL bit to a one (set confirmation). The payload format for the SET Response is shown in Table 36.

TABLE 36

Format for a SET property response

| Offset | Size | Name | Description |
|---|---|---|---|
| 0 | 2 | N | Total number of set properties confirmed |
| 2 | 6 | $PHR_0$ | Property Hash Record [0] |

TABLE 36-continued

Format for a SET property response

| Offset | Size | Name | Description |
|---|---|---|---|
| 8 | 6 | $PHR_1$ | Property Hash Record [1] |
| ... | ... | ... | More Property Hash Records |
| 6 × (N − 1) | 6 | $PHR_{(N-1)}$ | Last Property Hash Record |

A CLIENT may set a list of instances for any VECTOR LIST property. The format of the VECTOR LIST set-request sub-field is shown in Table 37.

TABLE 37

VECTOR LIST property set-request sub-field format

| Offset | Size | Name | Description |
|---|---|---|---|
| 0 | 2 | ic | instance count |
| 2 | sizeof(VALUE) | $VALUE_{idx}$ | VALUE @ idx |
| ... | ... | VALUE | More VALUES |
| 2 + (ic − 1) × sizeof(VALUE) | sizeof(VALUE) | $VALUE_{ic-1}$ | VALUE @ (ic − 1) |

Table 37 shows the first field in the VECTOR LIST property set-request as the instance count (ic) value. This may be the same value as contained in the IID.ic instance count field.

The VECTOR LIST and SCALAR set-requests may not support any modifications of the vc_count value. The vc_count value may always be a READ-ONLY parameter. The list of rules for a set-request on a SCALAR property is shown in Table 38.

TABLE 38

SCALAR set-request IID rules

| IID.idx | IID.ic | action | size/comments |
|---|---|---|---|
| 0 | 1 | Set scalar | (size depends on type), scalar value |
| X | 0 | Tx ERROR FRAME | Attempt to set v_count |
| X | >1 | Tx ERROR FRAME | Attempt to set a non-existent instance |

Any writing to a non-existent instance may generate an error frame. Since modification of the vc_count value is not supported, any VECTOR LIST set-requests with a zero-instance count (ic) may also generate an error. Table 39 shows a list of rules for a set-request on a VECTOR LIST property

TABLE 39

VECTOR LIST set-request IID rules

| IID.idx | IID.ic | Action | size/comments |
|---|---|---|---|
| idx | ic | Set VECTOR LIST | (unsigned short), instance count |
| X | 0 | Tx ERROR FRAME | (unsigned short), VECTOR LIST count |
| X | (idx + ic) > v_count | Tx ERROR FRAME | Attempt to write to a non-existent instance |

The data transport system that is described herein provides improvements in the operation of networked computer systems. The system described reduces the burden on developers during development. The PAMS may be generated and reside in the solution gateway nodes. The PAMS data is transferred to higher-level systems that can dynamically render a database of variables that are available in the node. This process happens automatically whenever the nodes are reprogrammed. In this manner, MASTER nodes do not need reprogramming to recognize changes to the data interface for a connected node. The described improvements may be especially useful in large networked systems as reprogramming all nodes would be difficult and require some downtime. The described improvements also allow for simple integration of new nodes. New nodes may be brought online and data from the node may be readily available to all nodes in the system.

Figure 29:
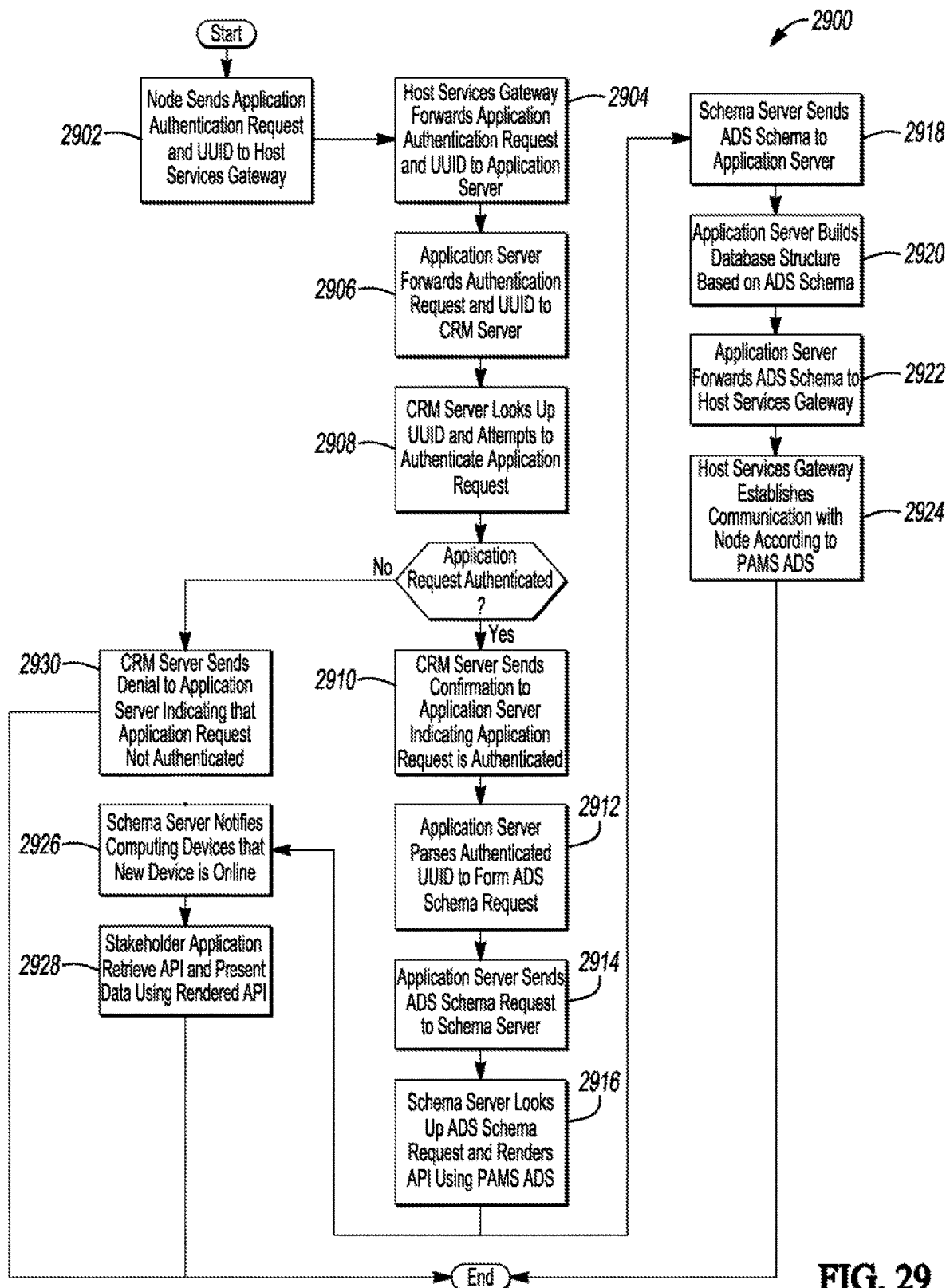
FIG. 29 is a flowchart for a possible sequence of operations for registering and binding a Universally Unique Identifier (UUID) to a Protocol Agnostic Metadata Schema (PAMS) ADS.

The process for registering and binding an application to a PAMS ADS may be described by flowchart 2900 as depicted in FIG. 29. The primary binding method entails a UUID-based registration process. This registration process results in the rendering of a dynamic API that allows an interface between the Schema Server 105 and computing devices 116.

At operation 2902, the Node 110 sends an application authentication request and UUID to the Host Services Gateway 106.

At operation 2904, the Host Services Gateway 106 forwards the same to the Application Server 104.

At operation 2906, the Application Server 104 forwards the authentication request and UUID to the CRM Server 107.

The CRM Server 107, at operation 2908, looks up the UUID and attempts to authenticate the application request. That is, the CRM Server 107 attempts to confirm whether the UUID is registered and is allowed.

If the application request is authenticated, at operation 2910, the CRM Server 107 sends a confirmation to the Application Server 104 indicating that the application request is authenticated.

At operation 2912, the Application Server 104 parses the authenticated UUID into the VID, a SID, and Version fields as discussed with reference to FIG. 2. This triplet of data defines an ADS schema request.

At operation 2914, the Application Server 104 sends the ADS schema request to the Schema Server 105.

The Schema Server 105, at operation 2916, identifies the PAMS ADS (schema) stored in the Schema Sever 105 based on the ADS schema request. The PAMS ADS defines a schema for a specific vendor, model number, and firmware version.

At operation 2918, the Schema Server 105 sends the PAMS ADS to the Application Server 104.

At operation 2920, the Application Server 105 builds a database structure based on the PAMS ADS.

At operation 2922, the Application Server 105 forwards the PAMS ADS to the HSG 106.

At operation 2924, the HSG 106 recognizes that the UUID request it sent at operation 2904 corresponds with the PAMS ADS received. Since the HSG 106 knows which of the Nodes 110 corresponds with the UUID request, the HSG 106 can establish communications with that Node 110 according to the received PAMS ADS.

Returning to the operation 2916, the Schema Server 105 at operation 2926 also notifies the computing devices 116 that a new device, with an application or a set of applications, has come online.

At operation 2928, if the computing devices 116 indicate they want to look at the device, the Schema Server 105 serves up the PAMS ADS to them, and the API is dynamically rendered on the computing devices 116.

Returning to the decision diamond, if the application request is not authenticated, the CRM Server 107 at operation 2930 sends a denial to the Application Server 104 indicating that the application request is not authenticated.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A data transport system comprising:
   an application server, including a first hardware processor coupled to a first memory, configured to read a portion of a universally unique identifier (UUID) of a node in communication with the application server, wherein the portion of the UUID defines a protocol agnostic metadata schema application descriptor sheet identifier (PAMS ADS ID);
   a schema server, including a second hardware processor coupled to a second memory, configured to retrieve a protocol agnostic metadata schema application descriptor sheet (PAMS ADS) that permits communication with local devices via independent native protocols, contains a list of property-type pairs, and corresponds to the PAMS ADS ID; and
   a host services gateway, including a third hardware processor coupled to a third memory, configured to establish communications with the node, obtain the PAMS ADS ID from the node, fetch the PAMS ADS using the PAMS ADS ID, and expose an interface of the node as a web application programmer's interface (API) using the PAMS ADS.

2. The data transport system of claim 1, wherein the property-type pairs define metadata-binding to a property value.

3. The data transport system of claim 1, wherein the PAMS ADS describes a protocol agnostic metadata schema (PAMS) that defines a data interface for variables.

4. The data transport system of claim 3, wherein the UUID changes as the data interface changes.

5. The data transport system of claim 3 further comprising the node, wherein the node includes a fourth hardware processor coupled to a fourth memory, and is configured to communicate with local devices via independent native protocols and to store the PAMS.

6. The data transport system of claim 5, wherein the PAMS is generated based on one or more enumerated types defined in one or more source code files for the node.

7. The data transport system of claim 5, wherein the variables are mapped to software variables used by the node.

8. The data transport system of claim 3, wherein the PAMS is encoded in extensible markup language (XML).

9. The data transport system of claim 3, wherein the PAMS is configured to bind instances of the variables to a record that describes the data interface.

10. A data transport method comprising:
reading a portion of a universally unique identifier (UUID) of a node, wherein the portion of the UUID defines a protocol agnostic metadata schema application descriptor sheet identifier (PAMS ADS ID);
retrieving a protocol agnostic metadata schema application descriptor sheet (PAMS ADS) that permits communication with local devices via independent native protocols, contains a list of property-type pairs, and corresponds to the PAMS ADS ID;
establishing communications with the node;
obtaining the PAMS ADS ID from the node;
fetching the PAMS ADS using the PAMS ADS ID; and
exposing an interface of the node as a web application programmer's interface (API) using the PAMS ADS.

11. The data transport method of claim 10, wherein the PAMS ADS describes a protocol agnostic metadata schema (PAMS) that defines a data interface for variables, further comprising binding instances of the variables to a record that describes the data interface using the PAMS.

12. A schema server comprising:
a hardware processor, coupled to a memory, configured to receive from an application server a portion of a universally unique identifier (UUID) of a node that defines a protocol agnostic metadata schema application descriptor sheet identifier (PAMS ADS ID), to retrieve from the memory a protocol agnostic metadata schema application descriptor sheet (PAMS ADS) that permits communication with local devices via independent native protocols, contains a list of property-type pairs, and corresponds to the PAMS ADS ID, and to send the PAMS ADS to a host services gateway such that the host services gateway, using the PAMS ADS, establishes communications with the node and exposes an interface of the node as a web application programmer's interface (API).

13. The schema server of claim 12, wherein the property-type pairs define metadata-binding to a property value.

14. The schema server of claim 12, wherein the PAMS ADS describes a protocol agnostic metadata schema (PAMS) that defines a data interface for variables.

15. The schema server of claim 14, wherein the UUID changes as the data interface changes.

* * * * *